US011144174B1

(12) United States Patent
Plesur et al.

(10) Patent No.: US 11,144,174 B1
(45) Date of Patent: Oct. 12, 2021

(54) PROVIDING TRENDING INFORMATION TO USERS

(71) Applicant: Google LLC, Mountain View, CA (US)

(72) Inventors: Gregory Harris Plesur, Arlington, MA (US); Noah Levin, San Francisco, CA (US); Arthur Edmond Blume, Melrose, MA (US); Peter Michael Gast, Arlington, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/958,627

(22) Filed: Apr. 20, 2018

Related U.S. Application Data

(63) Continuation of application No. 13/826,703, filed on Mar. 14, 2013, now Pat. No. 9,952,742.

(51) Int. Cl.
   *G06F 3/00* (2006.01)
   *G06F 3/0482* (2013.01)
   (Continued)

(52) U.S. Cl.
   CPC ............ *G06F 3/0482* (2013.01); *G06F 3/048* (2013.01); *G06F 3/0485* (2013.01);
   (Continued)

(58) Field of Classification Search
   CPC .... G06F 3/0482; G06F 3/048; G06F 3/04817; G06F 3/0485
   See application file for complete search history.

(56) References Cited

U.S. PATENT DOCUMENTS

| | | | |
|---|---|---|---|
| 7,797,402 B2 * | 9/2010 | Roos | G06F 3/04842 |
| | | | 709/219 |
| 8,370,348 B1 | 2/2013 | Reilly et al. | |

(Continued)

OTHER PUBLICATIONS

Hot Searches—Google, Trends, http://www.google.com/trends/hottrends, printed on Mar. 14, 2013, 1 paqe.

(Continued)

*Primary Examiner* — Nicholas Augustine
(74) *Attorney, Agent, or Firm* — Middleton Reutlinger

(57) ABSTRACT

A system may provide, via a user interface, information identifying two or more of trending search-related information, trending video-related information, trending image-related information, or trending news-related information. The two or more of the trending search-related information, the trending video-related information, the trending image-related information, or the trending news-related information are visually presented as graphical items. Each graphical item, of the graphical items, is visually identified as corresponding to the trending search-related information, the trending video-related information, the trending image-related information, or the trending news-related information. The user interface presents multiple graphical items simultaneously. The system may further receive information identifying a topic, and provide, based on receiving the information identifying the topic, a subsequent group of graphical items, on the user interface. The subsequent group of graphical items relates to the topic.

17 Claims, 30 Drawing Sheets

(51) Int. Cl.
*G06F 3/0486* (2013.01)
*G06F 3/0485* (2013.01)
*G06F 3/048* (2013.01)
*G06F 3/0481* (2013.01)
*G06F 3/0488* (2013.01)
*G06F 3/01* (2006.01)
*G06Q 50/00* (2012.01)

(52) U.S. Cl.
CPC ........ *G06F 3/0486* (2013.01); *G06F 3/04817* (2013.01); *G06F 3/04886* (2013.01); *G06Q 50/01* (2013.01)

(56) References Cited

U.S. PATENT DOCUMENTS

| | | | |
|---|---|---|---|
| 2007/0033220 A1* | 2/2007 | Drucker | G06F 16/48 |
| 2007/0168413 A1* | 7/2007 | Barletta | G06F 3/04883 |
| | | | 709/203 |
| 2007/0250901 A1 | 10/2007 | Mcintire et al. | |
| 2009/0158214 A1* | 6/2009 | Arnold | G06F 16/44 |
| | | | 715/830 |
| 2010/0220978 A1* | 9/2010 | Ogikubo | G11B 27/034 |
| | | | 715/716 |
| 2011/0271230 A1* | 11/2011 | Harris | G06F 3/0482 |
| | | | 715/810 |
| 2012/0143845 A1* | 6/2012 | Jiang | G06F 16/951 |
| | | | 707/710 |
| 2012/0254917 A1* | 10/2012 | Burkitt | G06F 16/735 |
| | | | 725/40 |
| 2013/0110823 A1 | 5/2013 | Su et al. | |
| 2013/0144869 A1* | 6/2013 | Shalabi | G06F 40/131 |
| | | | 707/722 |
| 2013/0167085 A1* | 6/2013 | Roundtree | G06F 3/04842 |
| | | | 715/810 |
| 2013/0298000 A1* | 11/2013 | Zuccarino | G06Q 50/01 |
| | | | 715/205 |
| 2014/0098140 A1* | 4/2014 | Tran | G09G 5/00 |
| | | | 345/660 |
| 2014/0223099 A1* | 8/2014 | Kidron | G06F 12/0806 |
| | | | 711/118 |
| 2014/0280017 A1* | 9/2014 | Indarapu | G06F 16/951 |
| | | | 707/711 |
| 2015/0186381 A1* | 7/2015 | Yan | G06F 16/16 |
| | | | 707/728 |
| 2015/0370920 A1* | 12/2015 | Van Os | G06F 16/90328 |
| | | | 707/767 |

OTHER PUBLICATIONS

YouTube Trends, http://youtube-trends.blogspot.com/, printed on Mar. 14, 2013, 1 page.
Trending Now—News Blog—Yahoo! News, Trending Now, http://news.yahoo.com/blogs/trending-now/, printed on Mar. 14, 2013, 1 page.

* cited by examiner

| TIME PD 310 | CATEGORY 320 | KEYWORD 330 | SPEED 340 | NO. 350 | SIZE 360 | VARIANCE 370 | LOCATION 380 |
|---|---|---|---|---|---|---|---|
| WEEKENDS | | | MEDIUM | 15 | SMALL | LARGE | SIDEBAR |
| WEEKDAYS, BETWEEN 5 AM AND 9 AM | NEWS, SEARCH | STOCK, FOOTBALL, BASKETBALL | SLOW | 16 | MEDIUM | MEDIUM | |
| WEEKDAYS, BETWEEN 7 PM AND 12 AM | NEWS, SEARCH, VIDEO | | SLOW | 10 | LARGE | LARGE | |
| ... | | | | | | | |
| TIME PD | CATEGORY | KEYWORD(S) | SPEED | NO. | SIZE | VARIANCE | LOCATION |

FIG. 3

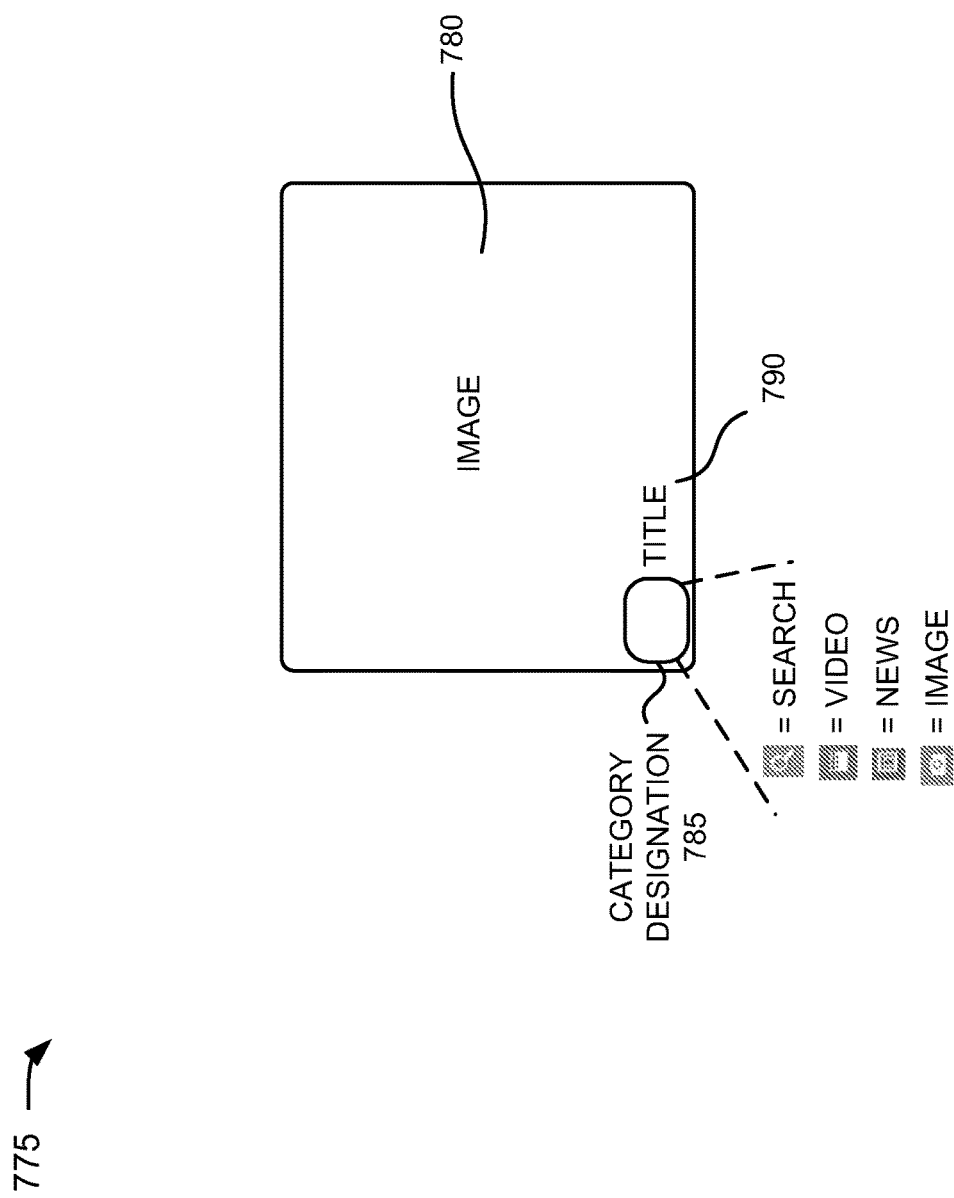

PROVIDING TRENDING INFORMATION TO USERS

CROSS REFERENCE TO RELATED APPLICATION

This patent application is a continuation (and claims the benefit of priority under 35 USC 120) of U.S. patent application Ser. No. 13/826,703, filed Mar. 14, 2013, which is herein incorporated by reference in its entirety. Accordingly, the disclosure of the prior application is considered part of (and is incorporated by reference in) the disclosure of this application.

BACKGROUND

Many techniques are available to users today to find information on the World Wide Web ("web"). For example, users often use browsers and/or search engines to find information of interest. The information of interest may include documents that are currently popular among a group of users, such as videos that are currently popular from a video provisioning service.

SUMMARY

According to some possible implementations, a method includes providing, by one or more processors of a device and via a user interface, information identifying two or more of trending search-related information, trending video-related information, trending image-related information, or trending news-related information, where the trending search-related information includes information identifying searches that are currently popular through a search-related service, the trending video-related information includes information identifying videos that are currently popular through a video-related service, the trending image-related information includes information identifying images that are currently popular through an image-related service, and the trending news-related information includes information identifying news items that are currently popular through a news-related service. The two or more of the trending search-related information, the trending video-related information, the trending image-related information, or the trending news-related information are visually presented as graphical items that are visually distinguished on the user interface, where each graphical item, of the graphical items, is visually identified as relating to the trending search-related information, the trending video-related information, the trending image-related information, or the trending news-related information. The user interface presents multiple graphical items simultaneously. The method further includes detecting, by the one or more processors and over a time period, user interaction with one or more graphical items, of the multiple graphical items presented on the user interface, where the user interaction includes one or more of selection of a graphical item on the user interface, or removal of a graphical item from the user interface. The method also includes adjusting, by the one or more processors, a subsequent group of graphical items, presented on the user interface, based on detecting the user interaction with the one or more graphical items over the time period.

According to some possible implementations, the user interface includes a first area and a second area, where the first area presents the information identifying two or more of the trending search-related information, the trending video-related information, the trending image-related information, or the trending news-related information. The method further includes detecting a movement of a first graphical item, of the multiple graphical items, from the first area to the second area; and presenting, based on the movement, one or more of other trending search-related information, other trending video-related information, other trending image-related information, or other trending news-related information, where the one or more of other trending search-related information, other trending video-related information, other trending image-related information, or other trending news-related information relate to the first graphical item.

According to some possible implementations, the user interface includes a first area and a second area, where the first area presents the information identifying two or more of the trending search-related information, the trending video-related information, the trending image-related information, or the trending news-related information. The method further includes detecting a movement of a first graphical item, of the multiple graphical items, from the first area to the second area; and storing information relating to the first graphical item based on the movement, where the storing causes the information relating to the first graphical item to be available when the user interface is accessed via different user devices.

According to some possible implementations, the user interface presents the multiple graphical items as a grid.

According to some possible implementations, providing, via the user interface, the information identifying two or more of the trending search-related information, the trending video-related information, the trending image-related information, or the trending news-related information includes causing the multiple graphical items to move across the user interface and be removed from the user interface, where additional graphical items are presented, via the user interface, as graphical items, of the multiple graphical items, are removed from the user interface.

According to some possible implementations, causing the multiple graphical items to move across the user interface includes causing a first graphical item, of the multiple graphical items, to be presented in a first manner, where the first manner is based on a measure of quality associated with the first graphical item; and causing a second graphical item, of the multiple graphical items, to be presented in a second manner, where the second manner is based on a measure of quality associated with the second graphical item. The second manner is different than the first manner. The first manner and the second manner relate to at least one of speeds at which the first graphical item and the second graphical item move across the user interface, sizes of the first graphical item and the second graphical item, or positions of the first graphical item and the second graphical item on the user interface.

According to some possible implementations, the method further includes detecting a selection of a first graphical item, of the multiple graphical items; and causing a new user interface to be provided based on detecting the selection of the first graphical item, where the new user interface includes two or more of image-related information relating to a topic of the first graphical item, video-related information relating to the topic of the first graphical item, news-related information relating to the topic of the first graphical item, or search-related information relating to the topic of the first graphical item.

According to some possible implementations, each graphical item, of the multiple graphical items, is associated with a first time of day. The method further includes detecting a scrolling of the user interface in a left-to-right direction, where the scrolling causes a different group of graphical items to be displayed that are associated with a second, earlier time of day.

According to some possible implementations, a system includes one or more processors to provide, via a user interface, information identifying two or more of trending search-related information, trending video-related information, trending image-related information, or trending news-related information, where the trending search-related information includes information identifying searches that are currently popular through a search-related service, the trending video-related information includes information identifying videos that are currently popular through a video-related service, the trending image-related information includes information identifying images that are currently popular through an image-related service, the trending news-related information includes information identifying news items that are currently popular through a news-related service. The two or more of the trending search-related information, the trending video-related information, the trending image-related information, or the trending news-related information are visually presented as graphical items, where each graphical item, of the graphical items, is visually identified as corresponding to the trending search-related information, the trending video-related information, the trending image-related information, or the trending news-related information. The user interface presents multiple graphical items simultaneously. The one or more processor are further to receive information identifying a topic, and provide, based on receiving the information identifying the topic, a subsequent group of graphical items, on the user interface, where the subsequent group of graphical items relates to the topic.

According to some possible implementations, the user interface includes a first area and a second area, where the first area presents the information identifying the two or more of the trending search-related information, the trending video-related information, the trending image-related information, or the trending news-related information. The one or more processors are further to detect a movement of a first graphical item, of the multiple graphical items, from the first area to the second area, and present, based on the movement, one or more of other trending search-related information, other trending video-related information, other trending image-related information, or other trending news-related information, where the one or more of other trending search-related information, other trending video-related information, other trending image-related information, or other trending news-related information relate to the first graphical item.

According to some possible implementations, the user interface includes a first area and a second area, where the first area presents the information identifying the two or more of the trending search-related information, the trending video-related information, the trending image-related information, or the trending news-related information. The one or more processors are further to detect a movement of a first graphical item, of the multiple graphical items, from the first area to the second area, and store information relating to the first graphical item based on the movement, where the storing causes the information relating to the first graphical item to be available when the user interface is accessed via different user devices.

According to some possible implementations, the graphical items are images.

According to some possible implementations, when providing, via the user interface, the information identifying two or more of the trending search-related information, the trending video-related information, the trending image-related information, or the trending news-related information, the one or more processors are to cause the multiple graphical items to move across the user interface and be removed from the user interface, where additional graphical items are presented, via the user interface, as graphical items, of the multiple graphical items, are removed from the user interface.

According to some possible implementations, when causing the multiple graphical items to move across the user interface, the one or more processors are to cause a first graphical item, of the multiple graphical items, to be presented in a first manner, where the first manner is based on a measure of quality associated with the first graphical item; and cause a second graphical item, of the multiple graphical items, to be presented in a second manner, where the second manner is based on a measure of quality associated with the second graphical item. The second manner is different than the first manner. The first manner and the second manner relate to at least one of speeds at which the first graphical item and the second graphical item move across the user interface, sizes of the first graphical item and the second graphical item, or positions of the first graphical item and the second graphical item on the user interface.

According to some possible implementations, the one or more processors are further to detect a selection of a first graphical item, of the multiple graphical items, and cause a new user interface to be provided based on detecting the selection of the first graphical item, where the new user interface includes two or more of image-related information relating to a topic of the first graphical item, video-related information relating to the topic of the first graphical item, news-related information relating to the topic of the first graphical item, or search-related information relating to the topic of the first graphical item.

According to some possible implementations, each graphical item, of the multiple graphical items, is associated with a first time of day. The one or more processors are further to detect a scrolling of the user interface in a left-to-right direction, where the scrolling causes a different group of graphical items to be displayed that are associated with a second, earlier time of day.

According to some possible implementations, a computer-readable medium stores instructions. The instructions include a group of instructions, which, when executed by one or more processors, cause the one or more processors to receive information identifying a topic; obtain, based on receiving the information identifying the topic, information identifying two or more of trending search-related information, trending video-related information, trending image-related information, or trending news-related information, where the trending search-related information includes information identifying searches that are currently popular through a search-related service, the trending video-related information includes information identifying videos that are currently popular through a video-related service, the trending image-related information includes information identifying images that are currently popular through an image-related service, or the trending news-related information includes information identifying news items that are currently popular through a news-related service. The two or more of the trending search-related information, the trending video-related information, the trending image-related information, or the trending news-related information relate to the topic. The group of instructions further cause the one or more processors to provide, via a user interface, the two or more of the trending search-related information, the trending video-related information, the trending image-related information, or the trending news-related information, where the two or more of the trending search-related information, the trending video-related information, the trending image-related information, or the trending news-related information are visually presented as graphical items on the user interface, where each graphical item, of the graphical items, is visually identified as corresponding to the trending search-related information, the trending video-related information, the trending image-related information, or the trending news-related information, and where the user interface presents multiple graphical items simultaneously.

According to some possible implementations, the user interface includes a first area and a second area, where the first area presents the information identifying the two or more of the trending search-related information, the trending video-related information, the trending image-related information, or the trending news-related information. The group of instructions further cause the one or more processors to detect a movement of a first graphical item, of the multiple graphical items, from the first area to the second area; and present, based on the movement, one or more of other trending search-related information, other trending video-related information, other trending image-related information, or other trending news-related information, where the one or more of other trending search-related information, other trending video-related information, other trending image-related information, or other trending news-related information relate to the first graphical item.

According to some possible implementations, the user interface includes a first area and a second area, where the first area presents the information identifying the two or more of the trending search-related information, the trending video-related information, the trending image-related information, or the trending news-related information. The group of instructions further cause the one or more processors to detect a movement of a first graphical item, of the multiple graphical items, from the first area to the second area, and store information relating to the first graphical item based on the movement, where the storing causes the information relating to the first graphical item to be available when the user interface is accessed via different user devices.

According to some possible implementations, each graphical item, of the multiple graphical items, is associated with a first time of day. The group of instructions further cause the one or more processors to detect a scrolling of the user interface in a left-to-right direction, where the scrolling causes a different group of graphical items to be displayed that are associated with a second, earlier time of day.

According to some possible implementations, a system includes means for providing, via a user interface, information identifying two or more of trending search-related information, trending video-related information, trending image-related information, or trending news-related information, where the trending search-related information includes information identifying searches that are currently popular through a search-related service, the trending video-related information includes information identifying videos that are currently popular through a video-related service, the trending image-related information includes information identifying images that are currently popular through an image-related service, and the trending news-related information includes information identifying news items that are currently popular through a news-related service. The two or more of the trending search-related information, the trending video-related information, the trending image-related information, or the trending news-related information are visually presented as graphical items, where each graphical item, of the graphical items, is visually identified as corresponding to the trending search-related information, the trending video-related information, the trending image-related information, or the trending news-related information. The user interface presents multiple graphical items simultaneously. The system further includes means for receiving information identifying a topic, and means for providing, based on receiving the information identifying the topic, a subsequent group of graphical items, on the user interface, where the subsequent group of graphical items relates to the topic.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 is a diagram of an example data structure that may store configuration parameters that may be used to configure a trending user interface;

FIG. 7M is an example configuration of an item that may be provided on the trending user interface;

DETAILED DESCRIPTION

Figure 1A:
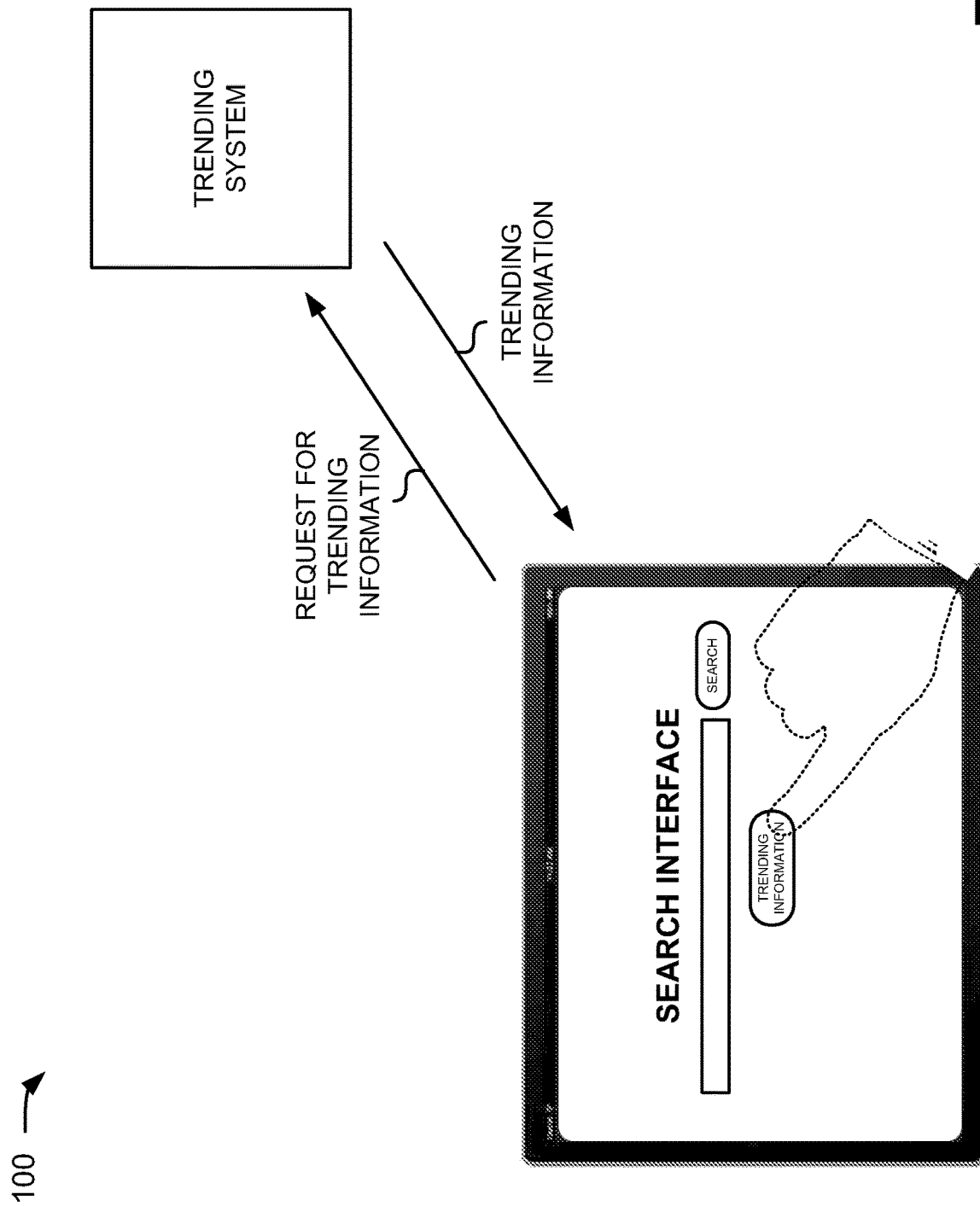
FIGS. 1A-1C are diagrams illustrating an overview of an example implementation described herein.

The following detailed description refers to the accompanying drawings. The same reference numbers in different drawings may identify the same or similar elements.

Systems and/or methods, as described herein, may provide a user interface that presents different categories of trending information. The trending information may include, for example, trending search queries, trending images, trending videos, trending news documents, and/or other categories of information that may currently be popular among a group of users. The user interface may present the trending information as images that allow the user to quickly review and identify trending information of interest across all the different categories of trending information. Moreover, the user may interact with the user interface to alter the trending information that is provided. For example, the user may provide a topic and the trending information may be adjusted based on the topic. In addition, the user's interaction with the user interface, such as selecting or removing trending information, may cause the trending information that is presented via the user interface to change.

Trending information is to be broadly interpreted as information that is currently popular among a group of users. For example, trending search-related information may include information identifying searches that are currently popular through a search-related service. Trending video-related information may include information identifying videos that are currently popular through a video-related service. Trending image-related information may include information identifying images that are currently popular through an image-related service. Trending news-related information may include information identifying news topics that are currently popular through a news-related service. A trending user interface may broadly be interpreted as a user interface that provides trending information.

A document, as the term is used herein, is to be broadly interpreted to include any machine-readable and machine-storable work product. A document may include, for example, an e-mail, a file, a combination of files, one or more files with embedded links to other files, a news article, a blog, a discussion group forum, etc. In the context of the Internet, a common document is a web page. Web pages often include textual information and may include embedded information, such as meta information, images, hyperlinks, etc., and/or embedded instructions, such as Javascript.

In situations in which systems and/or methods, as described herein, collect personal information about users, or make use of personal information, the users may be provided with an opportunity to control whether programs or features collect user information (e.g., information about a user's social network, social actions or activities, profession, a user's preferences, a user's current location, etc.), or to control whether and/or how to receive content that may be more relevant to the user. In addition, certain data may be treated in one or more ways before the data is stored and/or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected and used.

While the following description focuses on providing different categories of trending information, systems and methods, as described herein, are not so limited. For example, in some implementations, systems and methods, as described herein, may provide different categories of information that relate to a particular topic, such as a search query, a document, etc.

Figure 1B:
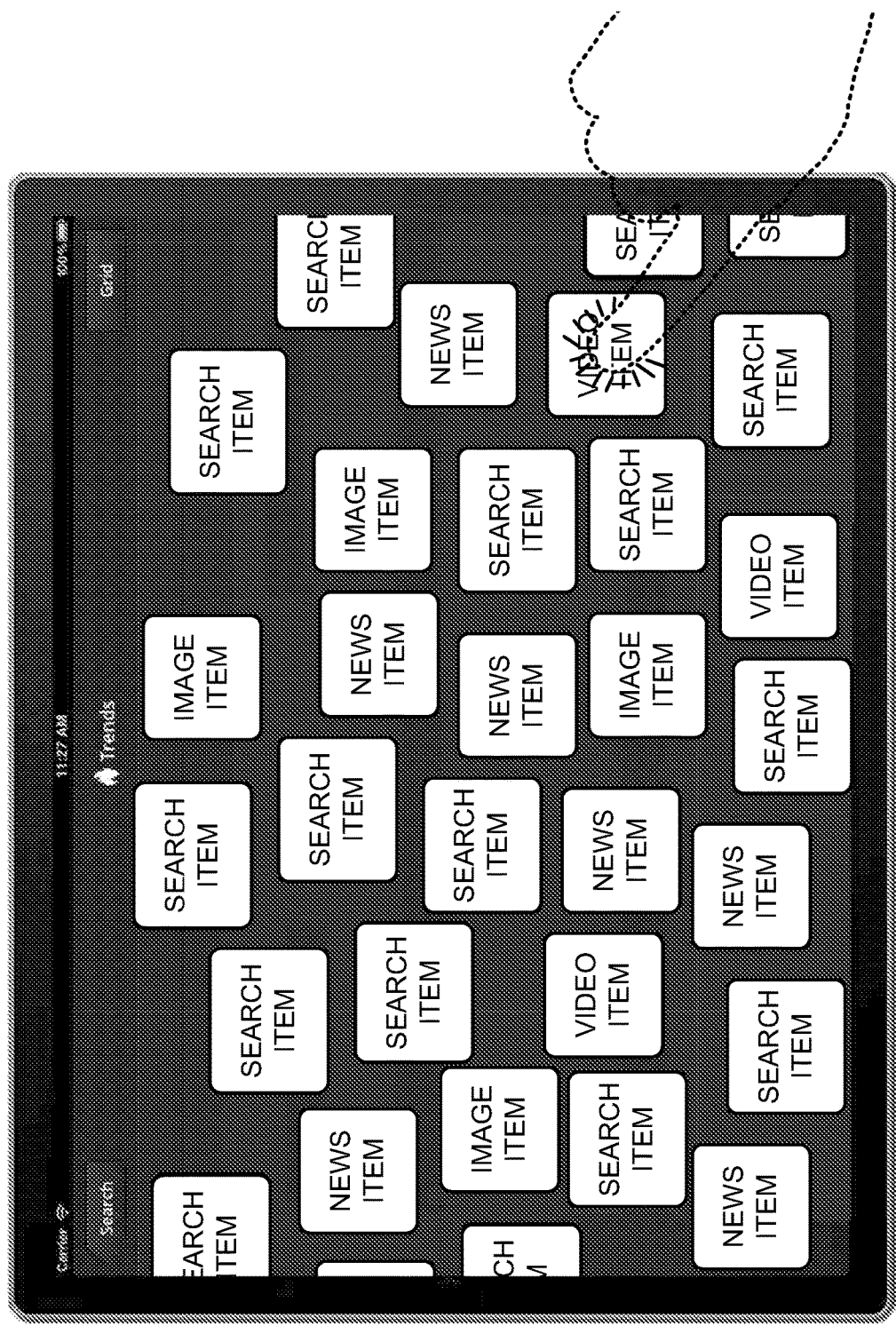
Figure 1C:
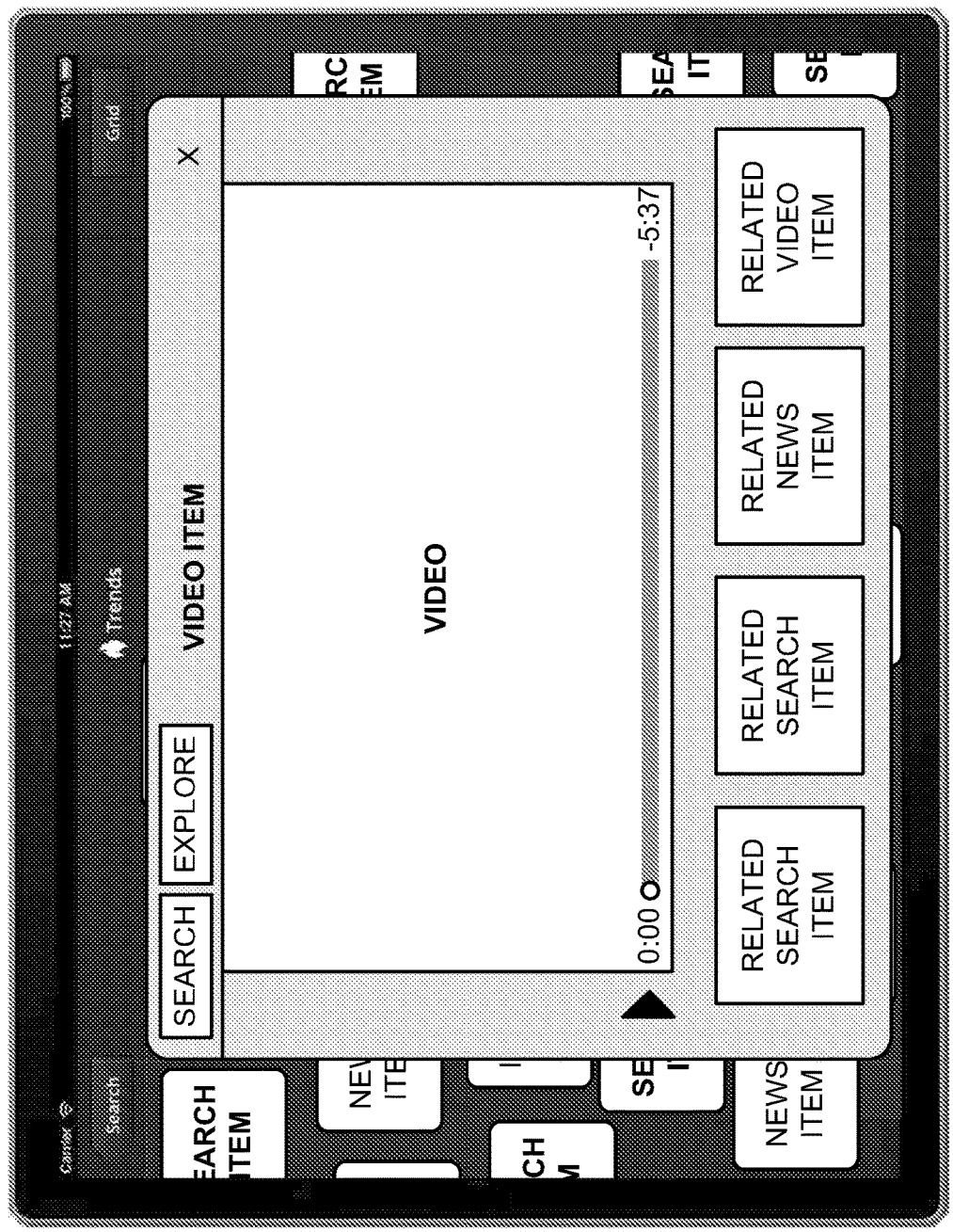

FIGS. 1A-1C are diagrams illustrating an overview 100 of an example implementation described herein. With reference to FIG. 1A, assume a user, of a user device, is interested in obtaining trending information. To obtain the trending information, assume that the user selects a TRENDING INFORMATION element on a search interface. In response, the user device may send a request, to a trending system, for the trending information. The trending system may obtain the trending information and provide the trending information, to the user device, for display to the user. The trending information may include different categories of information, such as trending search-related information, trending video-related information, trending image-related information, and/or trending news-related information.

With reference to FIG. 1B, the user device may display the trending information in a trending user interface. In some implementations, the trending information may be displayed as a group of images, where each image is visually identified as relating to the trending search-related information, the trending video-related information, the trending image-related information, or the trending news-related information. In this way, the user may easily identify information of interest. When the user identifies an item of interest, the user may simply select the item to obtain additional information. For example and as shown in FIG. 1B, the user has selected a particular video item. Based on the selection, the user device may obtain the video and present the video to the user, as shown in FIG. 1C. Thus, the user device may present the trending information, to the user, in a visually appealing manner, which allows the user easily identify and obtain information of interest.

Figure 2:
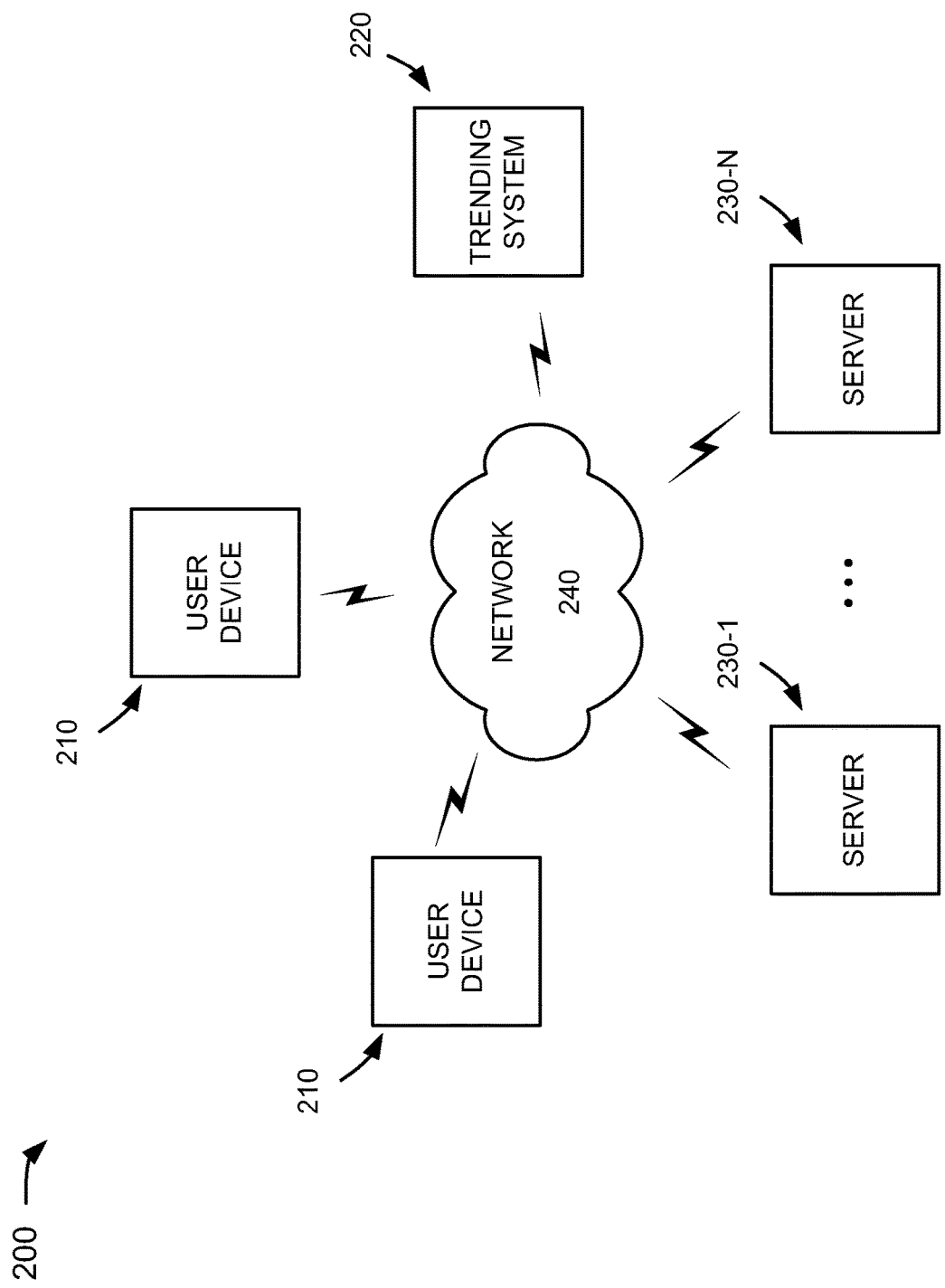
FIG. 2 is a diagram of an example environment in which systems and/or methods described herein may be implemented.

FIG. 2 is a diagram of an example environment 200 in which systems and/or methods described herein may be implemented. Environment 200 may include a group of user devices 210, a trending system 220, multiple servers 230-1 through 230-N (where N>1) (referred to collectively as "servers 230" and, at times, individually, as "server 230"), and a network 240.

User device 210 may include a device, or a collection of devices, that is capable of presenting trending information. Examples of user device 210 may include a smart phone, a personal digital assistant, a laptop, a tablet computer, a personal computer, and/or another type of device with the ability to present tending information. In some implementations, user device 210 may include a browser via which a trending user interface may be presented on a display associated with user device 210.

Trending system 220 may include a server device or a collection of server devices which may be co-located or remotely located. Trending system 220 may identify a number of different types of trending information, such as trending searches, trending videos, trending images, trending news documents, and/or other types of trending information. Trending system 220 may provide, to a trending user interface of user device 210, different types of trending information. In addition, trending system 220 may provide one or more user interfaces, to user device 210, to allow a user, of user device 210, to configure the trending user interface.

Server 230 may include a server device or a collection of server devices that may be co-located or remotely located. Any two or more of servers 230 may be implemented within a single, common server device or a single, common collection of server devices. Servers 230 may store trending information. For example, one of servers 230 may store search queries that have been provided to a search-related service and a quantity of times that the search queries have been provided. Another one of servers 230 may store information identifying videos and a quantity of times that the videos have been accessed. Still another one of servers 230 store information identifying images and a quantity of times the images have been accessed. Another one of servers 230 may store information identifying news documents and a quantity of times the news documents have been accessed.

Network 240 may include any type of network, such as, for example, a local area network ("LAN"), a wide area network ("WAN"), a telephone network, such as the Public Switched Telephone Network ("PSTN") or a cellular network, an intranet, the Internet, or a combination of these or other types of networks. User device 210, trending system 220, and servers 230 may connect to network 240 via wired and/or wireless connections. In other words, any one of user device 210, trending system 220, and/or servers 230 may connect to network 240 via a wired connection, a wireless connection, or a combination of a wired connection and a wireless connection.

Although FIG. 2 shows example components of environment 200, in some implementations, environment 200 may include additional components, fewer components, different components, or differently arranged components than those depicted in FIG. 2. Additionally, or alternatively, one or more components of environment 200 may perform one or more tasks described as being performed by one or more other components of environment 200.

FIG. 3 is a diagram of an example data structure 300 that may store configuration parameters that may be used to configure a trending user interface. In some implementations, data structure 300 may be associated with user device 210. In some implementations, data structure 300 may be associated with another device, such as trending system 220.

As illustrated, data structure 300 may maintain a group of entries in the following example fields: a time period (PD) field 310, a category field 320, a keyword field 330, a speed field 340, a number (NO.) field 350, a size field 360, a variance field 370, and a location field 380. In some implementations, data structure 300 may be associated with a particular user. In some implementations, data structure 300 may be associated with a particular user device of a particular user. Thus, assuming that the user has a smartphone and a tablet computer, data structure 300 may store information relating to a first manner in which the trending user interface is to be presented on the user's smartphone and a second, different manner in which the trending user interface is to be presented on the user's tablet computer.

Time period field 310 may store information identifying a time period for which a particular set of configuration parameters are to be used. The time period may include, for example, a date, a date range, one or more days of a week, a time range, and/or some other quantity of time. In some implementations, the time period may be user-specified. In some implementations, if no time period is provided in time period field 310, the same configuration parameters may be used in all situations.

Category field 320 may store information identifying one or more categories of information. Example categories may include a search-related category, a video-related category, an image-related category, a news-related category, and/or other types of categories. The search-related category may specify that trending search-related items (e.g., currently popular search queries) are to be provided to the user interface. The video-related category may specify that trending video-related items (e.g., currently popular videos) are to be provided to the user interface. The image-related category may specify that trending image-related items (e.g., currently popular images) are to be provided to the user interface. The news-related category may specify that trending news-related items (e.g., currently popular news documents) are to be provided to the user interface. In some implementations, all available categories may be considered when no category is specified in category field 320. In some implementations, the category or categories identified in category field 320 may be user-specified.

Keyword field 330 may store one or more keywords that may be used to identify items to be provided in a user interface. In those instances when one or more categories are identified in category field 320, the keyword(s), identified in keyword field 330, may be used to obtain items in the identified one or more categories. By way of example, assume that category field 320 stores information identifying video-related information and keyword field 330 stores the keyword "football." In this example, trending videos relating to football may be provided to the user interface. In those situations where no category is identified in category field 320, the keyword(s), identified in keyword field 330, may be used to obtain items in all available categories. In some implementations, the keyword(s) may be user-specified.

Speed field 340 may store information indicating a speed at which items are to move across the trending user interface before being removed. In some implementations, the speed may be specified, for example, as slow, medium, or fast. In some implementations, the speed may be specified using a value, from a range of permissible values. Other ways of specifying a speed may alternatively be used. In some implementations, the speed, specified in speed field 340, may, for example, correspond to a minimum speed, an average speed, or a maximum speed. In some implementations, the speed may be user-specified.

Number field 350 may store information indicating the quantity of items to be simultaneously provided on the trending user interface. For example, a set of configuration parameters may specify that 15 items are to be simultaneously provided. In some implementations, the quantity of simultaneous items to be provided on the trending user interface may be user-specified. In some implementations, a default quantity of simultaneous items may be provided to the trending user interface when no quantity of simultaneous items is specified by the user.

Size field 360 may store information indicating a size at which the items are to be graphically displayed on the trending user interface. In some implementations, the size may be specified, for example, as small, medium, or large. In some implementations, the size may be specified using a value, from a range of permissible values. Other ways of specifying a size may alternatively be used. In some implementations, the size, specified in size field 360, may, for example, correspond to a minimum size, an average size, or a maximum size. In some implementations, the size may be user-specified.

Variance field 370 may store information indicating an amount of variance that is to be used to identify items to be provided on the trending user interface. For example, when a keyword is specified in keyword field 330, variance field 370 may specify how closely items should relate to the specified keyword. When no keyword is specified in keyword field 330, variance field 370 may specify, for example, how wide a variety of trending information is to be provided to the trending user interface. In some implementations, the variance may be specified, for example, as small, medium, or large. In some implementations, the variance may be specified using a value, from a range of permissible values. Other ways of specifying a variance may alternatively be used. In some implementations, the variance may be user-specified.

Location field 380 may store information identifying a location, on a display of user device 210, at which the trending user interface is to be presented. Example locations may include a sidebar, a footer bar, a header bar, or another location. Other example locations may include presenting the trending user interface as a screensaver or a desktop wallpaper. In some implementations, the location may be specified on a per device or per application basis. For example, location field 380 may store first information, identifying a first location for the trending user interface, when user device 210 corresponds to a first type of device (e.g., a tablet computer) and second information, identifying a second, different location for the trending interface, when user device 210 corresponds to a second, different type of device (e.g., a personal computer or laptop). Similarly, location field 380 may store first information, identifying a first location for the trending user interface, when user device 210 is executing a first application and second information, identifying a second, different location for the trending interface, when user device 210 is executing a second, different application. Location field 380 may also store information indicating whether or not the trending user interface is to be persistently presented at the specified location. In some implementations, the location may be user-specified.

As one example of a set of configuration parameters for a trending user interface, as illustrated in FIG. 3, a user specified that during the weekends, items are to be captured from all of the available categories, the items are to move across the trending user interface at a medium speed, 15 items are to be simultaneously provided on the trending user interface, the items are to be graphically displayed in a small size, and that a large amount of variance is to be used in identifying the items. Moreover, the user has specified that the trending user interface is to be presented as a sidebar. As another example, the user has specified that during weekdays, between the hours of 5 AM and 9 AM, news-related items and search-related items are to be identified based on the keywords "stock," "football," and "basketball," the identified items are to move across the trending user interface at a slow speed, 16 items are to be simultaneously provided on the trending user interface, the items are to be graphically displayed in a medium size, and that a medium amount of variance is to be used in identifying the items. As one additional example, the user has specified that during weekdays, between the hours of 7 PM and 12 AM, news-related items, search-related items, and video-related items are to be identified, the identified items are to move across the trending user interface at a slow speed, 10 items are to be simultaneously provided the trending user interface, the items are to be graphically displayed in a large size, and that a large amount of variance is to be used in identifying the items.

Although FIG. 3 shows example fields of data structure 300, in some implementations, data structure 300 may include additional fields, different fields, or fewer fields than those depicted in FIG. 3. For example, data structure 300 may also store information identifying a language in which the trending information is to be provided on the trending user interface. Moreover, data structure 300 may also store information identifying a position, on the trending user interface, at which higher quality items are to be placed. For example, the configuration parameter may specify that higher quality items are to be located in the middle of the trending user interface and lower quality items are to be located above and below the higher quality items.

Figure 4:
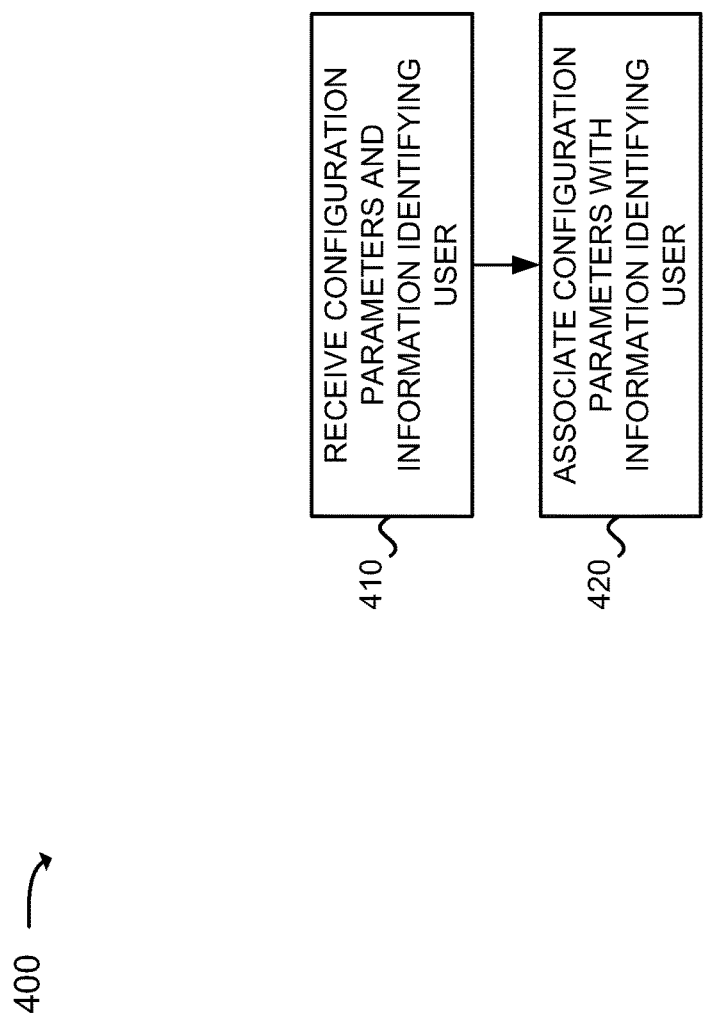
FIG. 4 is a flowchart of an example process for setting configuration parameters for a trending user interface.

FIG. 4 is a flowchart of an example process 400 for setting configuration parameters for a trending user interface. In some implementations, process 400 may be performed by trending system 220. In some implementations, some or all of the blocks described below may be performed by a different device or group of devices, including or excluding trending system 220.

Process 400 may include receiving configuration parameters and information identifying the user (block 410). For example, trending system 220 may receive one or more configuration parameters from a user. The configuration parameters may include parameters relating to identifying items that are to be provided on the trending user interface and/or a manner in which the items are to be provided (e.g., the speed at which the items are to move across the trending user interface, a quantity of items to be simultaneously provided, a size at which the items are to be graphically displayed, a variance with which the items are to be identified, a position, on the trending user interface, at which higher quality items are to be provided, and/or other parameters relating to the manner in which the items are to be provided).

In some implementations, trending system 220 may provide a user interface to user device 210 (e.g., to a browser of user device 210) to allow the user to specify the one or more configuration parameters. In some implementations, user device 210 may download an application associated with obtaining trending information. In these implementations, user device 210 may provide the user interface via the application. In any event, the user may specify the one or more configuration parameters, via the user interface, and may cause the one or more configuration parameters to be sent to trending system 220.

In some implementations, trending system 220 may receive one or more configuration parameters, from user device 210, based on the user interacting with the trending user interface. For example, trending system 220 may receive one or more positive signals, from user device 210, based on the user selecting an item on the trending user interface, saving an item from trending user interface for later review, obtaining additional items relating to an item, or otherwise expressing an interest in an item. The positive signals may include information identifying the category with which the selected item is related, one or more keywords associated with the selected item, etc. Additionally, or alternatively, trending system 220 may receive one or more negative signals, from user device 210, based on the user discarding an item from the trending user interface or otherwise expressing a disinterest in an item. The negative signals may include information identifying the category with which the discarded item is related, one or more keywords associated with the discarded item, etc.

Trending system 220 may also receive information identifying the user and/or user device 210. For example, trending system 220 may provide a user interface to user device 210 to allow the user to specify the identification information. In some implementations, trending system 220 may receive the identification information via a log in process. In those implementations where user device 210 downloads an application associated with obtaining trending information, user device 210 may transmit the identification information using the application.

Process 400 may include associating the configuration parameters with the information identifying the user (block 420). For example, trending system 220 may store the configuration parameters in a data structure, such as data structure 300. Trending system 220 may associate the data structure (or that portion of the data structure that stores the configuration parameters) with the information identifying the user and/or user device 210.

In some implementations, trending system 220 may determine whether a time period specified in the received set of configuration parameters conflicts (e.g., matches or overlaps) with an already stored time period associated with a different set of configuration parameters. If the new time period conflicts with an already stored time period, trending system 220 may request that the user provide a priority to the two sets of configuration parameters.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5:
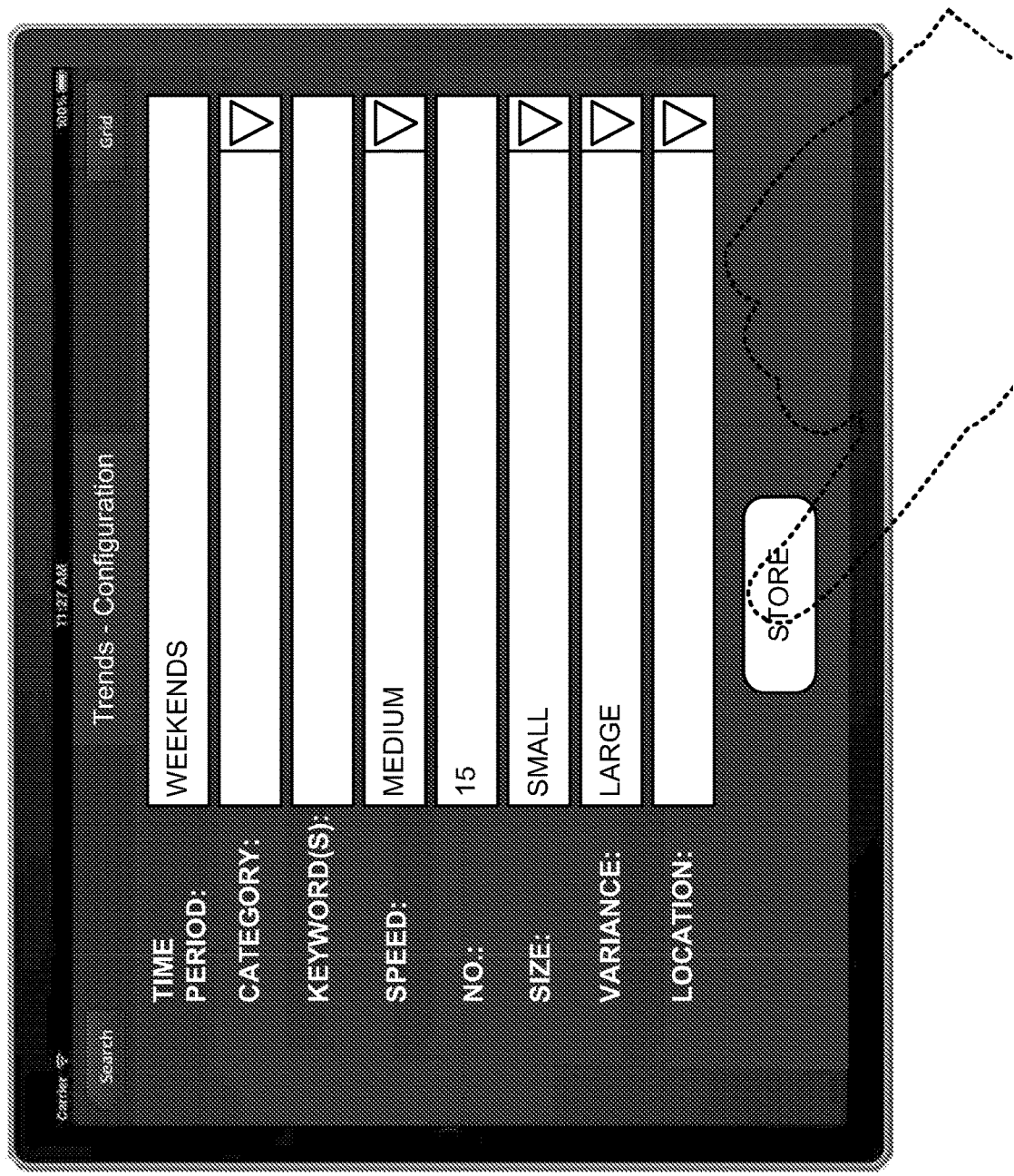
FIG. 5 is an example user interface that may be used in connection with the process described with respect to FIG. 4.

FIG. 5 is an example user interface 500 that may be used in connection with the process described above with respect to FIG. 4. With respect to FIG. 5, assume that a user has requested to configure a set of configuration parameters for the trending user interface. In response to the request, user device 210 may provide a user interface 500 that allows the user to enter a set of configuration parameters. As illustrated in FIG. 5, user interface 500 may allow the user to specify any or all of the following example parameters: one or more time periods, one or more categories, one or more keywords, a speed at which items are to move across the trending user interface, a quantity of items to be simultaneously provided on the trending user interface, a size at which the items are to be graphically displayed on the trending user interface, a quantity of variance that is to be used in identifying items to provide via the trending user interface, and a location at which the trending user interface is to be provided. In example 500, the user has specified that during weekends, items are to be provided based on all the available categories. The user has further specified that the items are to move across the trending user interface at a medium speed and that the items are to be graphically displayed in a small size. Moreover, the user specified that a large amount of variance is to be used in identifying the items that are provided via the trending user interface. By selecting the STORE button on user interface 500, user device 210 may cause the received set of configuration parameters to be transmitted to trending system 220. Trending system 220 may receive the set of configuration parameters and store the set of configuration parameters in, for example, a data structure, such as data structure 300. Additionally, or alternatively, user device 210 may store the set of configuration parameters in a local memory.

Although FIG. 5 shows example fields of user interface 500, in some implementations, user interface 500 may include additional fields, different fields, fewer fields, or differently arranged fields than those depicted in FIG. 5.

Figure 6A:
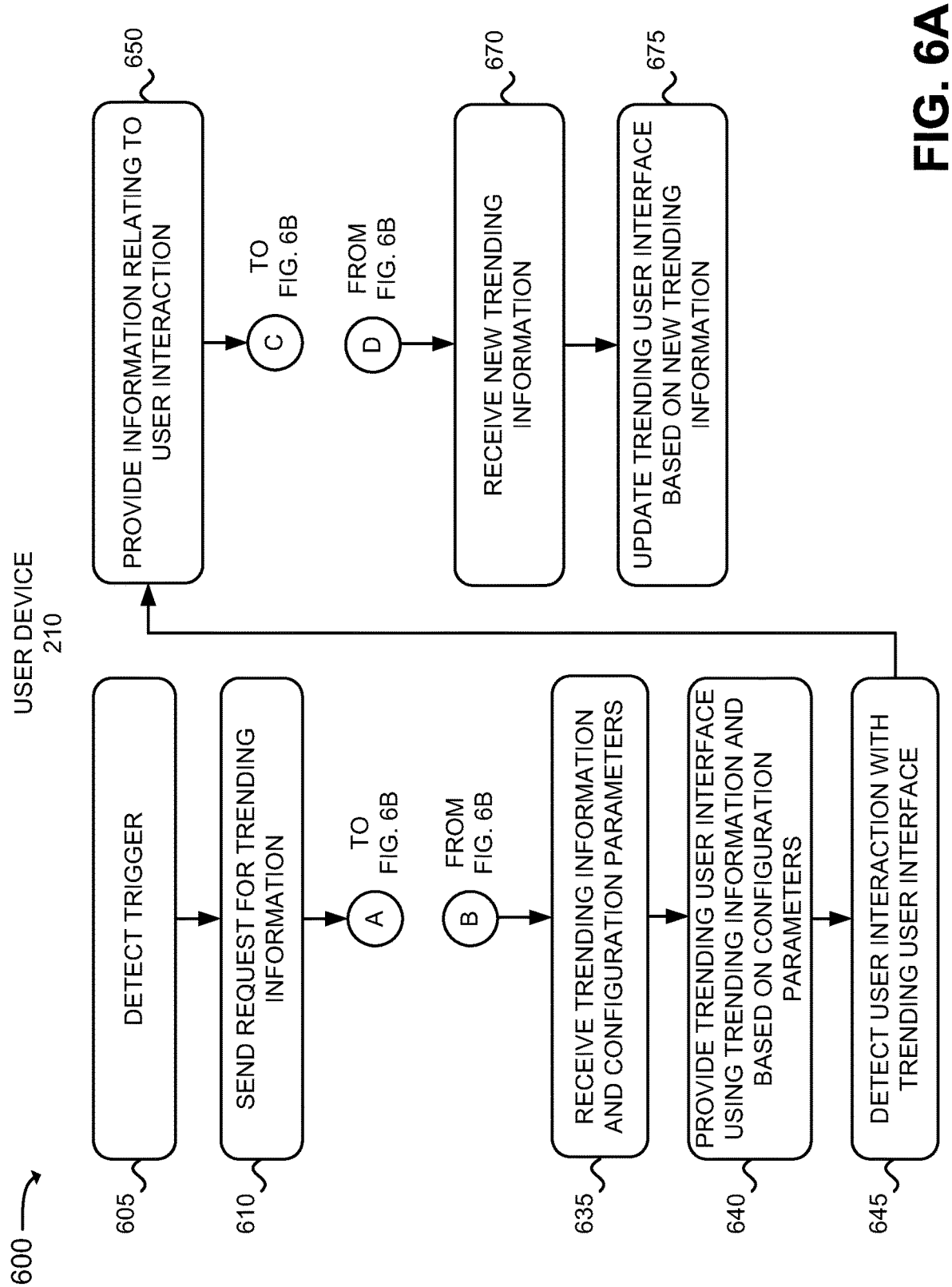
FIGS. 6A and 6B are a flowchart of an example process for providing trending information.
Figure 6B:
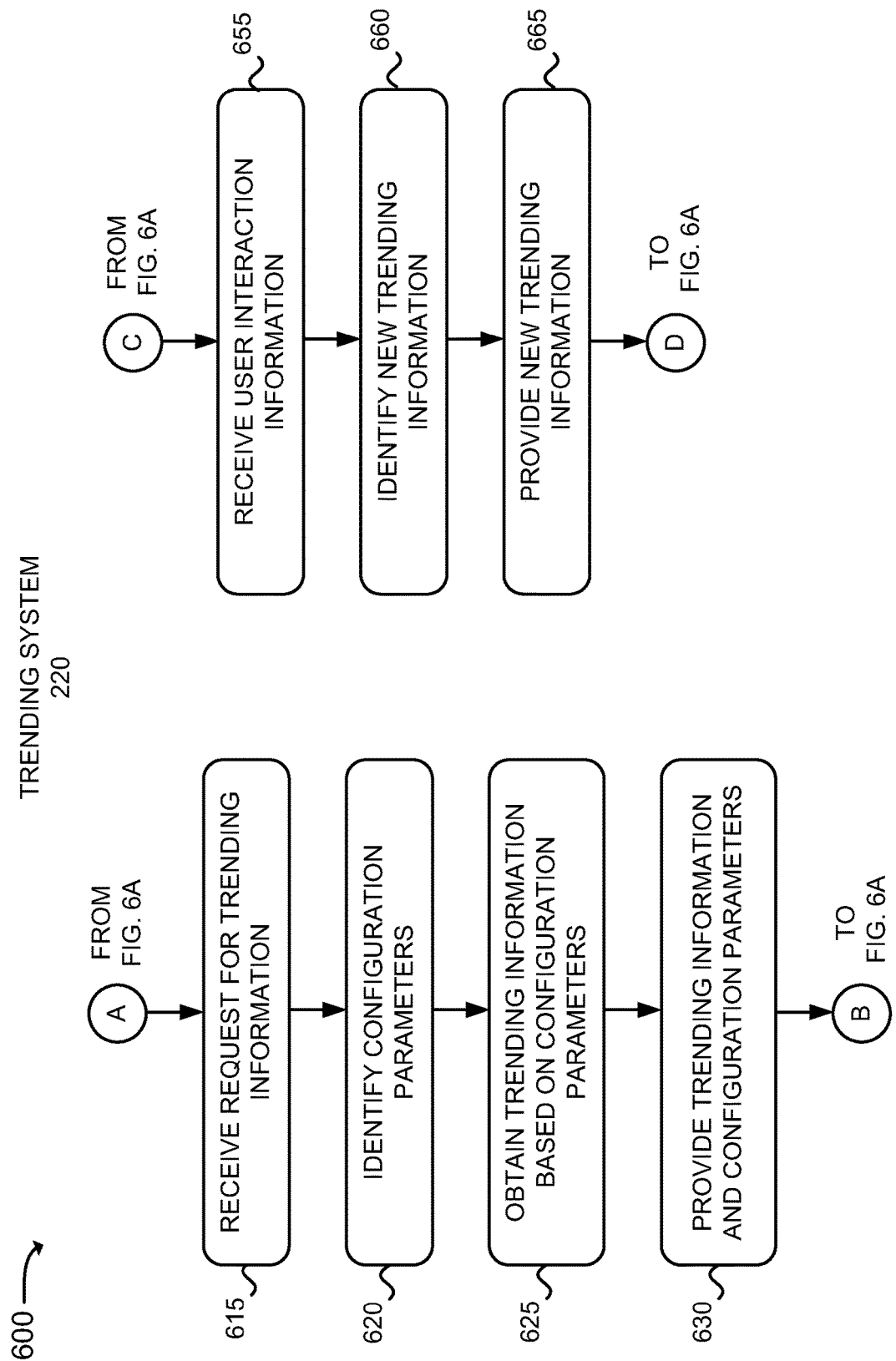

FIGS. 6A and 6B are a flowchart of an example process 600 for providing trending information. While FIG. 6 shows process 600 as including a particular sequence of blocks being performed by user device 210 and trending system 220, in some implementations, some of the blocks of process 600 may be performed by a different device or group of devices, including or excluding user device 210 and trending system 220.

Process 600 may include detecting a trigger (block 605, FIG. 6A). For example, user device 210 may detect a trigger that signals a request for a trending user interface. In some implementations, user device 210 may generate the trigger based on a user action. For example, user device 210 may generate the trigger based on detecting a user's selection of an element that is displayed by user device 210. The element may include, for example, a button, a link, a menu item, an icon, etc. In some implementations, the element may be located on a search interface, such as a search engine home page. In some implementations, the element may be located on a document that provides search results. In some implementations, the element may be associated with an application that provides trending information. In these implementations, the element may be located on a desktop of user device 210 or in a list of applications available to user device 210. The element may be located in other areas of a document, desktop, menu, etc.

In some implementations, user device 210 or trending system 220 may alter the appearance of the element, such as in those situations where an event occurred that causes a particular topic or topics to show a strong upward trend in popularity. As an example, if a particular tragedy occurs, topics relating to the tragedy may suddenly become particularly popular. In these implementations, user device 210 or trending system 220 may alter the appearance of the element. For example, user device 210 or trending system 220 may alter the color, size, or shape of the element or may cause the element to flash. Other ways of alerting the user of particular topic or topics showing a strong upward trend in popularity may alternatively be used. In any event, user device 210 may generate a trigger based on detecting selection of the element.

In some implementations, user device 210 may generate the trigger based on receiving a particular command from the user. For example, the launching of the trending user interface may be associated with a particular audible and/or textual command. When user device 210 receives the particular command, user device 210 may generate the trigger. In some implementations, user device 210 may generate the trigger based on detecting a particular gesture being made on a display of user device 210. The gesture may include a touch, swipe, and/or another motion on the display of user device 210. In some implementations, the gesture may include swiping a currently displayed document to the left. When user device 210 detects the particular gesture, user device 210 may generate the trigger.

In some implementations, user device 210 may generate the trigger without user interaction. For example, in a situation where the trending user interface is provided as a screensaver or as desktop wallpaper, user device 210 may generate the trigger without user interaction. Instead, user device 210 may generate the trigger based on user device 210 being powered up, user device 210 entering a power savings mode, and/or in response to another event.

Process 600 may further include sending a request for trending information (block 610). For example, user device 210 may send a request for trending information to trending system 220. In some implementations, the request may include information identifying the user. In some implementations, the request may include one or more configuration parameters relating to items to be provided and/or relating to a manner in which the items are to be provided on the trending user interface.

Process 600 may include receiving the request for trending information (block 615, FIG. 6B). For example, trending system 220 may receive the request for trending information from user device 210.

Process 600 may include identifying configuration parameters (block 620). For example, trending system 220 may identify configuration parameters that indicate the trending information to provide, to user device 210, and/or the manner in which the trending information is to be provided to user device 210. Example configuration parameters may include one or more categories of information (e.g., a search-related category, a video-related category, an image-related category, a news-related category, and/or other types of categories) that are to be provided to user device 210, one or more keywords that are to be used to obtain trending information, a speed at which items are to move across the trending user interface, a quantity of items to be simultaneously provided on the trending user interface, a size at which the items are to be graphically displayed on the trending user interface, a quantity of variance that is to be used in identifying items to provide via the trending user interface, and a location, on a display of user device 210, at which the trending user interface is to be provided.

In some implementations, trending system 220 may identify the configuration parameters based on information in the request. For example, trending system 220 may parse the request to identify information identifying the user and may use the information identifying the user to identify configuration parameters that are associated with the user (e.g., from a data structure, such as data structure 300). In some implementations, the request may include one or more configuration parameters. For example, the request may include information identifying one or more categories of information (e.g., a search-related category, a video-related category, an image-related category, a news-related category, and/or other types of categories) that are to be provided to user device 210, one or more keywords that are to be used, by trending system 220, to obtain trending information, information identifying a speed at which items are to move across the trending user interface, information identifying a quantity of items to be simultaneously provided on the trending user interface, information identifying a size at which the items are to be graphically displayed on the trending user interface, information identifying a quantity of variance that is to be used in identifying items to provide via the trending user interface, and information identifying a location at which the trending user interface is to be provided. In these implementations, trending system 220 may parse the request to identify the configuration parameters.

In some implementations, trending system 220 may obtain a date and/or time associated with the request. The date and/or time may correspond to a date/time that the request was sent or received. Trending system 220 may use the date and/or time to identify configuration parameters. For example, trending system 220 may use the date and/or time to obtain the configuration parameters from a data structure, such as data structure 300.

In some implementations, trending system 220 may identify default configuration parameters. For example, when the request is not associated with information that allows for a set of configuration parameters to be identified, trending system 220 may identify a default set of configuration parameters. The default set of configuration parameters may identify one or more of the configuration parameters discussed above.

Process 600 may further include obtaining trending information based on the configuration parameters (block 625). For example, trending system 220 may use the configuration parameters to obtain trending information. In some implementations, the trending information may include items, such as search-related items, video-related items, image-related items, news-related items, and/or other types of items.

Trending system 220 may use the configuration parameters to identify items. For example, when the configuration parameters include information identifying one or more categories of information, trending system 220 may obtain items in the identified one or more categories. When the configuration information includes one or more keywords, trending system 220 may use the one or more keywords to obtain items. For example, trending system 220 may compare the one or more keywords to entries in an index of trending information to identify items relating to the one or more keywords. When the configuration parameters include information identifying an amount of variance that is to be used in identifying items to provide via the trending user interface, trending system 220 may use the identified amount of variance to identify the items.

In some implementations, trending system 220 may generate a score for each item based on the configuration parameters and use the scores to determine which items are to be provided to user device 210. In some implementations, trending system 220 may modify the score, of an item, based on one or more factors. For example, trending system 220 may modify the score, of an item, based on a popularity score of the item. In some implementations, the popularity score of an item may be generated based on user behavior data associated with the item, such as how many users expressed disinterest in the item by, for example, removing the item from a trending user interface and/or how many users expressed interest in the item by, for example, selecting the item when the item is provided on a trending user interface. In some implementations, the popularity score of an item may be generated using one or more factors instead of, or in addition to, the user behavior data, such as an age of the item, a prior ranking or score of the item, or the like.

In some implementations, trending system 220 may modify the score, of an item, based on a personalization score of the item. In some implementations, the personalization score of an item may be generated based on user activity data, associated with a user of a particular user device 210, with regard to the item, such as whether the user has expressed disinterest in the item by, for example, removing the item from the trending user interface and/or whether the user expressed interest in the item by, for example, selecting the item when the item was presented on the trending user interface. In some implementations, the personalization score of an item may be generated using one or more factors instead of or in addition to, the user activity data, such as whether the user has recommended the item to one of the user's social contacts.

In some implementations, trending system 220 may modify the score, of an item, based on a social score of the item. In some implementations, the social score of an item may be generated based on friend activity data, associated with social contacts of the user of a particular user device 210, with regard to the item. The user's social contacts may be identified based on the user's communications, the user's address book, and/or the user's account on one or more social networks. Examples of friend activity data, associated with an item, include whether the user's social contacts have expressed disinterest in the item by, for example, removing the item from a trending user interface and/or whether the user's social contacts expressed interest in the item by, for example, selecting the item on a trending user interface that was presented to the social contacts' user devices 210. In some implementations, the social score of an item may be generated using one or more factors instead of, or in addition to, the friend activity data, such as whether the social contacts have recommended the item to others.

In some implementations, trending system 220 may generate a total score for an item based on a combination of the score and the popularity score, the personalization score, and/or the social score. In some implementations, trending system 220 may generate a total score for an item based on a combination of the score, the popularity score, the personalization score, and the social score. In some implementations, trending system 220 may generate a total score for an item based on a weighted combination of the score, the popularity score, the personalization score, and the social score. For example, trending system 220 may assign a weight value to the score, the popularity score, the personalization score, and/or the social score. The weight values may differ—in other words, the amount that each of the score, the popularity score, the personalization score, and the social score contributes to the total score may vary. Trending system 220 may combine the weighted score, the weighted popularity score, the weighted personalization score, and/or the weighted social score to generate the total score. The total score, for an item, may reflect a measure of quality of the item.

Trending system 220 may select a set of items, to be provided to user device 210, based on their scores. For example, trending system 220 may rank the items based on their scores and select the top scoring X items (X>1). In some implementations, the quantity of items, in the selected set of items, may based on the configuration parameters (e.g., based on a speed at which items are to move across the trending user interface, a quantity of items to be simultaneously provided on the trending user interface, and/or a size at which the items are to be graphically displayed on the trending user interface).

Process 600 may include providing trending information and configuration parameters (block 630). For example, trending system 220 may provide the obtained trending information and configuration parameters to user device 210. In some implementations, the trending information may include a ranked list of items. Each item may, for example, be associated with information identifying the category with which the item is associated (e.g., search, video, image, news, etc.), information identifying the item, an image associated with the item, a date/time associated with the item, and/or other types of information.

The configuration parameters may include information relating to a manner in which the provided items are to be displayed by the trending user interface at user device 210. For example, the configuration parameters may include information relating to a speed at which items are to move across the trending user interface, a quantity of items to be simultaneously provided on the trending user interface, a size at which the items are to be graphically displayed in the trending user interface, and/or a location at which the trending user interface is to be displayed. In some implementations, a different speed may be specified for different items in the set of items. For example, the speed may be specified based on the score of the item. In some implementations, the speed of a higher scoring item may be set to be slower than the speed of a lower scoring item. In some implementations, a different size may be specified for different items in the set of items. For example, the size may be specified based on the score of the item. In some implementations, the size of a higher scoring item may be set to be bigger than the size of a lower scoring item. In some implementations, user device 210 may store the configuration parameters. In these implementations, trending system 220 may not provide the configuration parameters.

Process 600 may include receiving the trending information and the configuration parameters (block 635, FIG. 6A). For example, user device 210 may receive the trending information and the configuration parameters from trending system 220.

Process 600 may include providing a trending user interface using the trending information and based on the configuration parameters (block 640). For example, based on receiving the trending information, user device 210 may cause a trending user interface to be provided on a display of user device 210. User device 210 may cause the received items to be presented in a manner consistent with the configuration parameters. Further details regarding an example trending user interface is provided below with respect to FIG. 7A.

Process 600 may include detecting user interaction with the trending user interface (block 645). For example, user device 210 may detect that the user has interacted with the trending user interface. In some implementations, the user interaction may include a negative user interaction relating to an item and/or a positive user interaction relating to an item. Negative user interaction may include the user physically removing an item from the trending user interface (e.g., by dragging the item to a particular location), the user allowing an item to move across the trending user interface and be removed without selecting the item (e.g., user inactivity with respect to the item), and/or other similar types of user activity. Positive user interaction may include the user physically moving an item to a particular location on the trending user interface, which indicates an interest in the item (e.g., by dragging the item to the particular location), the user saving an item for later consideration, the user requesting additional items relating to an item, the user selecting an item on the trending user interface, and/or other similar types of user activity.

Process 600 may include providing information relating to the user interaction (block 650). For example, user device 210 may provide information relating to the user interaction to trending system 220. In some implementations, the information may include information identifying the item and information relating to whether the user interaction is negative, e.g., indicating that the user is not interested in the item, or positive, e.g., indicating that the user is interested in the item.

Process 600 may include receiving the information relating to the user interaction (block 655, FIG. 6B). For example, trending system 220 may receive the information relating to the user interaction from user device 210. In some implementations, trending system 220 may store the information in a profile relating to the user of user device 210.

Process 600 may include identifying new trending information (block 660). For example, trending system 220 may parse the received information to identify the item to which the user interaction relates and whether the user interaction was negative or positive. Trending system 220 may identify new items to provide to user device 210 based on the identified item and whether the user interaction was negative or positive. For example, when the user interaction is negative, trending system 220 may identify new items, to provide to user device 210, that are unrelated to the identified item. When the user interaction is positive, trending system 220 may identify new items, to provide to user device 210, that are related to the identified item.

Process 600 may include providing the new trending information (block 665). For example, trending system 220 may provide the new trending information to user device 210. In some implementations, the new trending information may include a ranked list of new items. Each item may, for example, be associated with information identifying the category with which the item is associated (e.g., search, video, image, news, etc.), information identifying the item, an image associated with the item, and/or other types of information.

Process 600 may include receiving the trending information and the configuration parameters (block 670, FIG. 6A). For example, user device 210 may receive the new trending information from trending system 220.

Process 600 may include updating the trending user interface based on the new trending information (block 675). For example, user device 210 may cause new items to be presented on the trending user interface based on the new trending information. User device 210 may cause the new items to be presented in a manner consistent with the configuration parameters.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
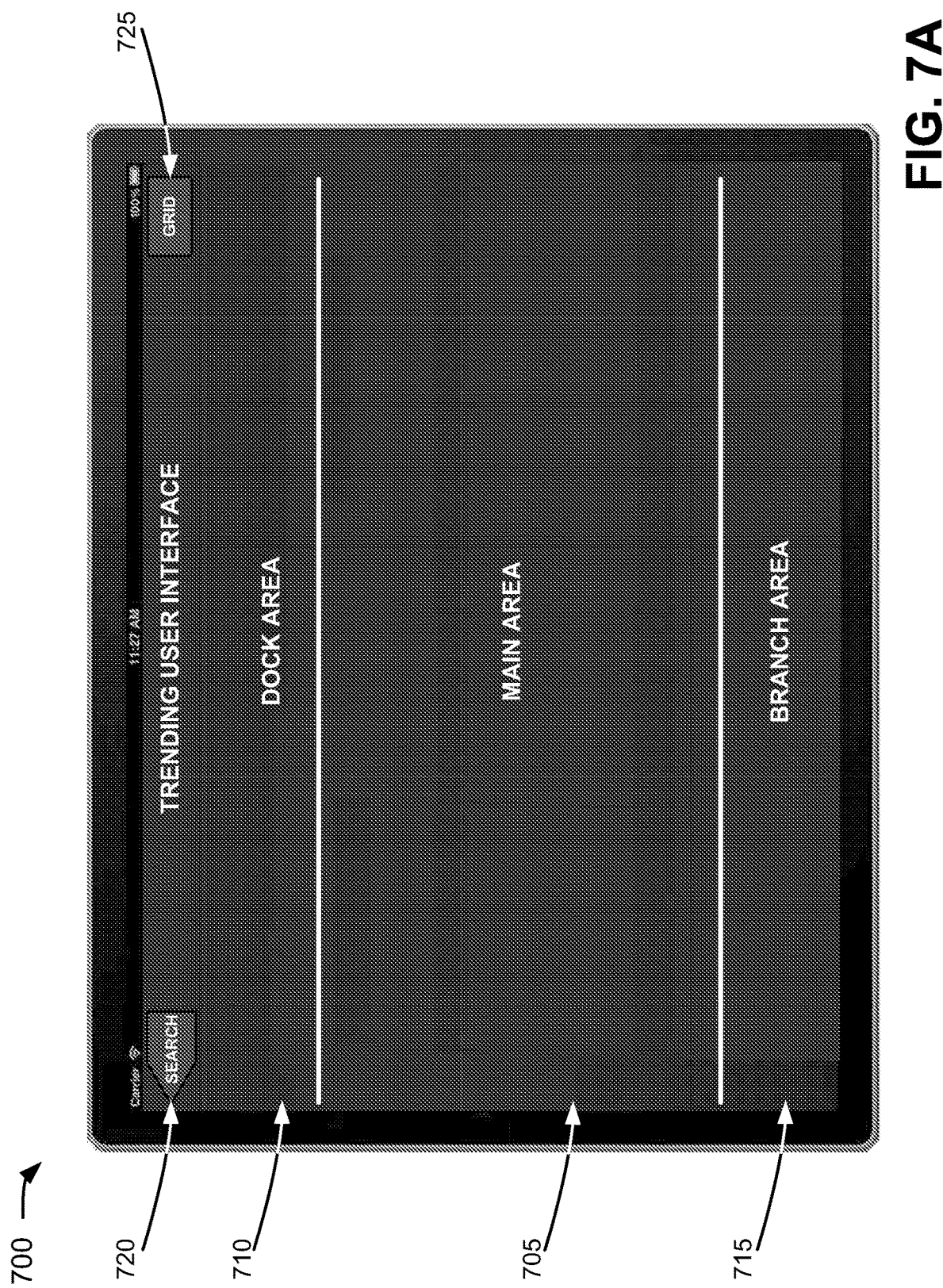
FIG. 7A is an example configuration of a trending user interface.

FIG. 7A is an example configuration of a trending user interface 700. As shown, trending user interface 700 may include a main area 705, a dock area 710, a branch area 715, a search element 720, and a display element 725.

Main area 705 may include an area, of trending user interface 700, where items, received from trending system 220, may appear. In some implementations, user device 210 may cause the items, in main area 705, to move, as if in a stream of water, from the left side of trending user interface 700 to the right side of trending user interface 700. Thus, additional items appear on the left side of trending user interface 700 and items are removed from the right side of trending user interface 700. In some implementations, user device 210 may present the items in a static manner in main area 705. In either event, user device 210 may allow the user to move the items, displayed in main area 705, in a left-to-right or right-to-left direction, which causes additional items to appear in main area 705 and causes displayed items to be removed from main area 705. In some implementations, moving the items in a right-to-left direction may cause items, which were previously removed from main area 705, to reappear. Thus, in this way, the user may recapture items that have been removed from main area 705.

In some implementations, as items are continually moved in a left-to-right direction, the additional items that are displayed, in main area 705, may become more diverse and speculative. Thus, if the items, displayed in main area 705, are directed to a particular topic, as items are continually moved in a left-to-right direction, the additional items that are displayed in main area 705 may begin to diverge from the topic.

In some implementations, one or more items, displayed in main area 705, may be configured to be automatically selected. For example, as an auto-selected item moves across trending user interface 700, additional information, relating to the item, may appear, as if the user had selected the item. User device 210 may determine which items are to be auto-selected based on a number of factors, including the user's past interaction with trending user interface 700.

Dock area 710 may include an area, of trending user interface 700, where items may be placed which may be of interest to the user of user device 210. For example, a user, of user device 210, may move an item from main area 705 to dock area 710 in order to later review the item. To later review the item, the user may simply select the item, such as by touching or clicking on the item. In some implementations, when an item is placed in dock area 710, the item may be available whenever the user accesses trending user interface 700 and regardless of the user device from which the user accesses trending user interface 700. To remove the item from dock area 710, the user may simply drag the item back to main area 705 or off the right or left side of trending user interface 700.

Branch area 715 may include an area, of trending user interface 700, where items may be placed which may be of interest to the user of user device 210. In some implementations, when an item is placed in branch area 715, user device 210 may cause items, relating to the placed item, to appear in branch area 715. For example, a user, of user device 210, may move an item from main area 705 to branch area 715. User device 210 may detect that the item is placed in branch area 715 and may send a request, to trending system 220, for additional trending information related to the item. The request may include, for example, information identifying the item. Trending system 220 may obtain items relating to the identified item and may provide those identified items to user device 210. Other ways of identifying an item may alternatively be used. For example, a twisting gesture on a particular item, in main area, may cause items, relating to the twisted item, to appear in branch area 715. As another example, each item, displayed in main area 705, may include an element that, if selected, causes items, related to the item that includes the element, to be displayed. Thus, selection of an element on an item, in main area 705, may cause items, relating to the item, to appear in branch area 715.

User device 210 may cause the related items to be displayed in branch area 715 of trending user interface 700. In some implementations, user device 210 may present the received items in a dynamic manner. For example, user device 210 may cause the received items to move, as if in a stream of water, from the left side of trending user interface 700 to the right side of trending user interface 700. Thus, additional items appear on the left side of trending user interface 700 and items are removed from the right side of trending user interface 700. In some implementations, user device 210 may cause the received items to be displayed, in branch area 715, in a static manner. In these implementations, user device 210 may allow the user to move the items, displayed in branch area 715, in a left-to-right or a right-to-left direction, which causes additional items to appear in branch area 715 and causes displayed items to be removed from branch area 715. To remove the items from branch area 715, the user may simply drag one of the received items back to main area 705 or off the right or left side of trending user interface 700. To change the items in branch area 715, the user may simply drag a different item, from main area 705, to branch area 715.

In some implementations, instead of related items being displayed in branch area 715, the related items may be displayed in main area 705. For example, in some implementations, an item that is identified for branching (e.g., by detecting that the item has been moved to a particular location of trending user interface 700, that an element on the item has been selected, that a twisting gesture has been made in relation to the item, etc.) may remain stationary in main area 705, as the related items move in a left-to-right direction across trending user interface 700. If the user wishes to return to the previous items, the user may simply drag the stationary item to a particular location on or off trending user interface 700. Other ways of returning to the previous items may alternatively be used.

Search element 720 may include a button or another type of selectable element that causes user device 210 to provide an interface that allows the user to perform a search. In some implementations, when a search is performed using the interface, user device 210 may cause items, relating to the search, to be displayed in main area 705. For example, user device 210 may receive one or more search terms in the interface and may send a request, to trending system 220, for additional trending information. The request may include, for example, information identifying the one or more search terms. Trending system 220 may obtain items relating to the search terms and may provide those identified items to user device 210. User device 210 may cause the received items to be displayed in main area 705. In some implementations, when a search is performed using the interface, user device 210 may perform a network search and provide a document that includes a ranked list of search results, relating to the search.

Display element 725 may include a button or another type of selectable element that causes user device 210 to change the manner in which items are provided in main area 705. In some implementations, display element 725 may allow the user to choose between providing items, in main area 705, in a static manner or a dynamic manner. The static manner may include, for example, providing the items in a non-moving, grid pattern. The dynamic manner may include, for example, providing the items in moving, grid or non-grid pattern. Other manners of providing items, in main area 705, may alternatively be used.

Although FIG. 7A shows an example configuration of trending user interface 700, in some implementations, trending user interface 700 may include additional areas/elements, different areas/elements, fewer areas/elements, or differently arranged areas/elements than those depicted in FIG. 7A. For example, in some implementations, trending user interface 700 may simply include main area 705, and not include dock area 710 or branch area 715.

Figure 7B:
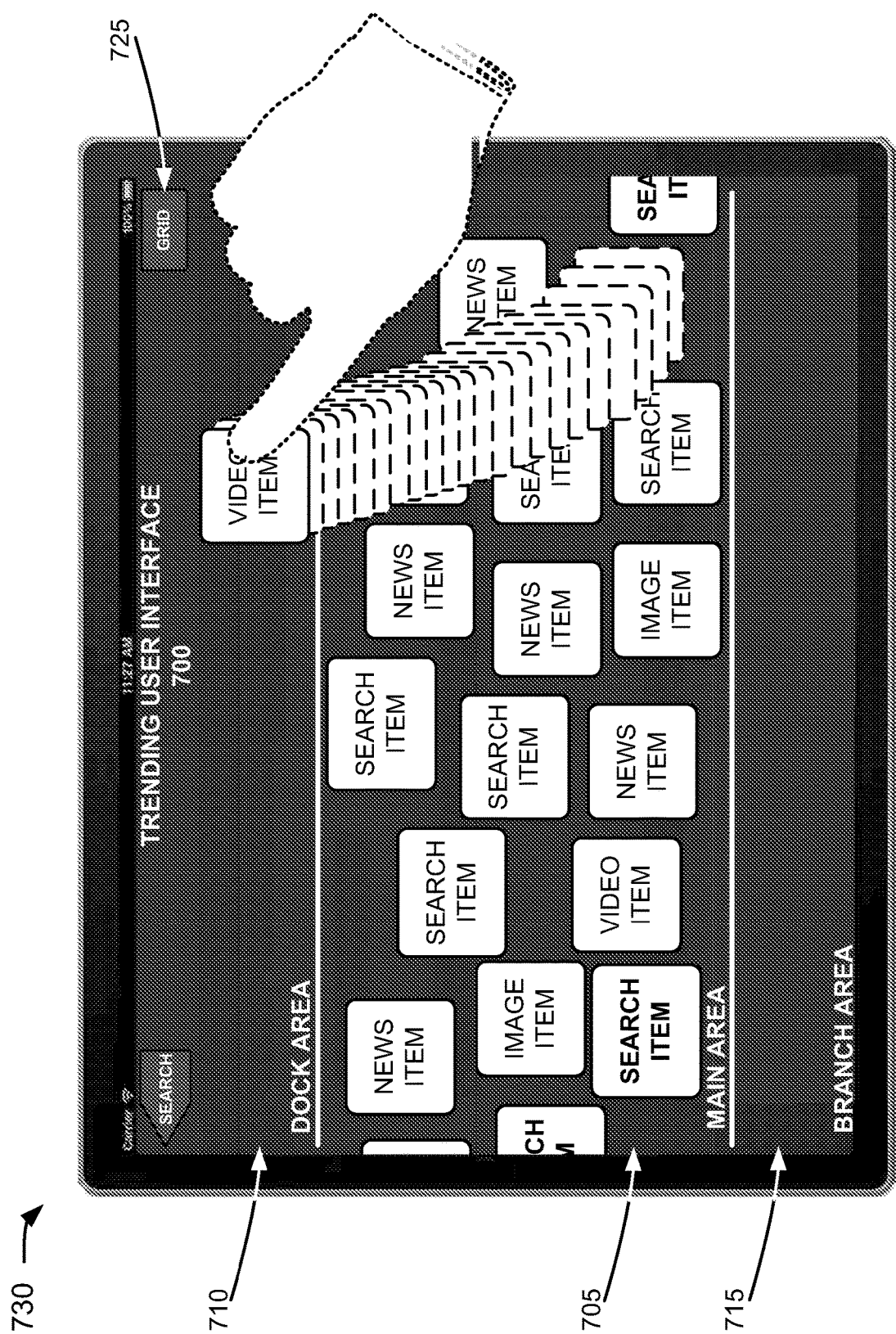
FIGS. 7B-7I are an example of the process described with respect to FIGS. 6A and 6B.

FIGS. 7B-7I are an example 730 of the process described above with respect to FIGS. 6A and 6B. With reference to FIG. 7B, assume that a user, of user device 210, has requested trending information. In response, assume that user device 210 has provided a trending user interface 700 with a configuration similar to that described above with respect to FIG. 7A. Moreover, assume that trending user interface 700 displays a number of items, in main area 705, that move in a left to right direction. Further, assume that the user is interested in a particular video-related item, but wants to review the video-related item at a later time. Thus, as shown in FIG. 7B, the user may move the video-related item, from main area 705, to dock area 710. Once moved to dock area 710, the video-related item may remain on trending user interface 700 until removed. Thus, the user may select the video-related item at a later time.

Figure 7C:
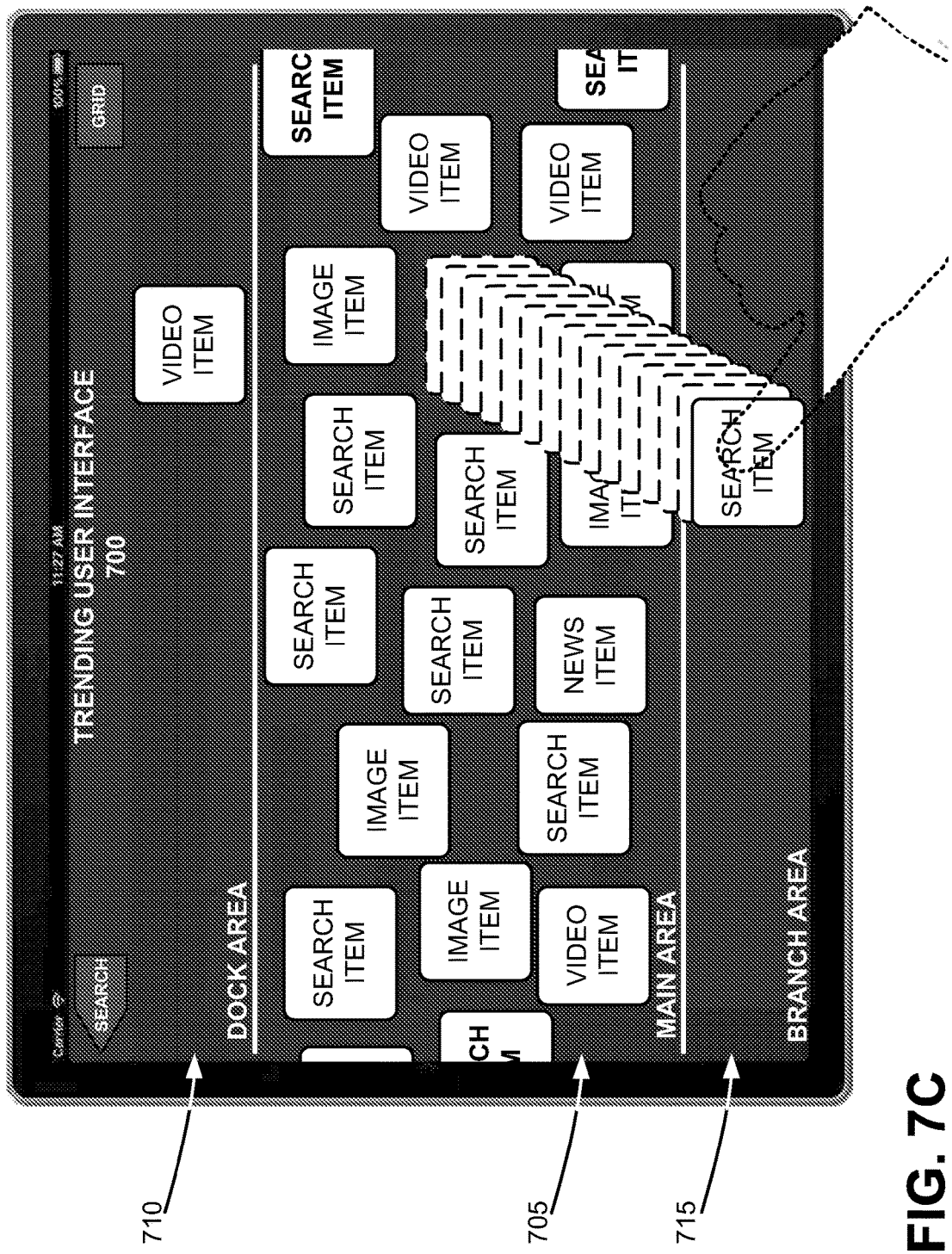
Figure 7D:
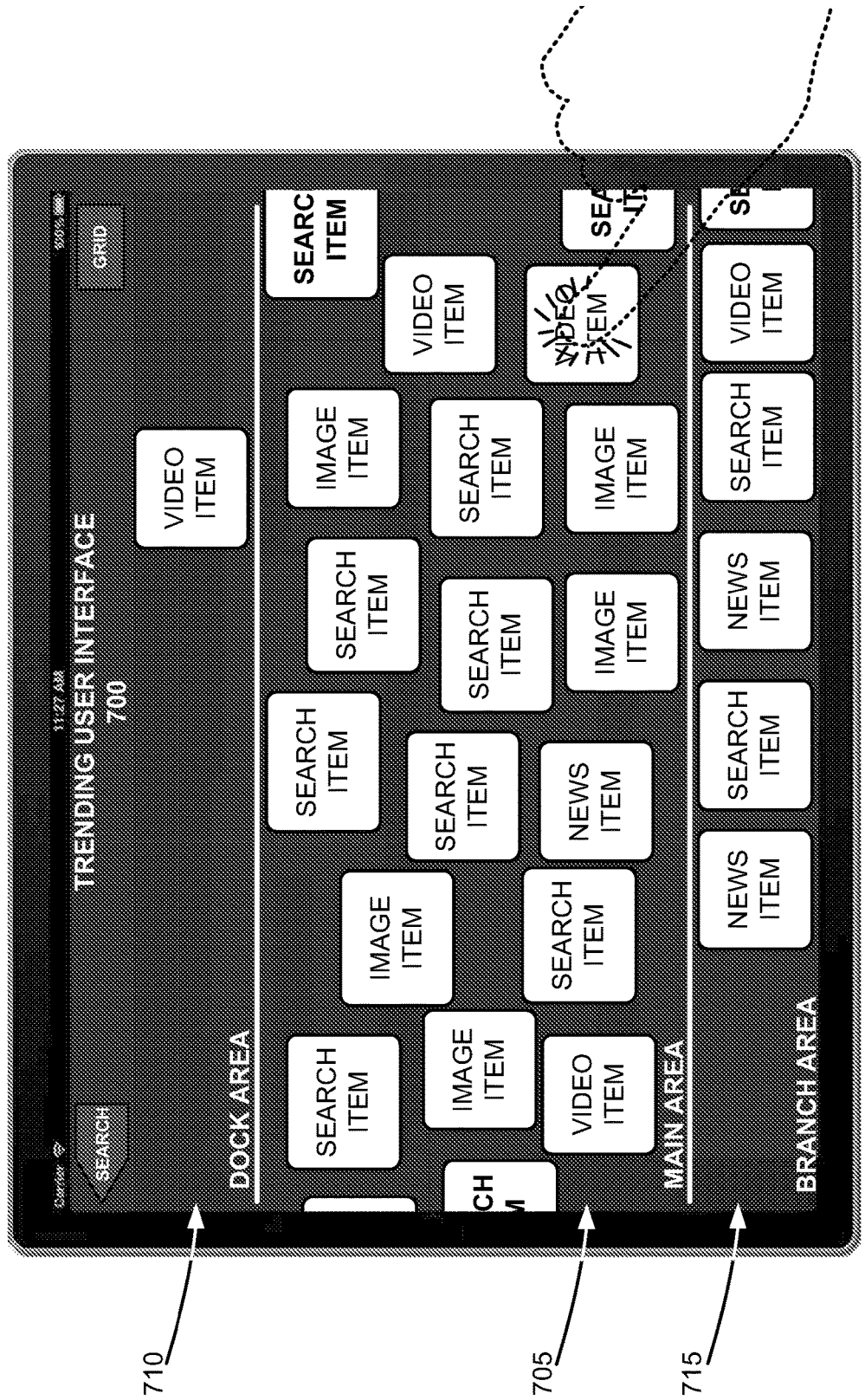

With reference to FIG. 7C, assume that, at some later point in time, the user is interested in obtaining additional items relating to a particular search-related item. Thus, as shown in FIG. 7C, the user may move the search-related item, from main area 705, to branch area 715. Once moved to branch area 715, user device 210 may cause additional items to be obtained, from trending system 220, relating to the search-related item, as shown in FIG. 7D. Thus, in this way, the user may obtain additional items relating to a particular item of interest in main area 705.

Figure 7E:
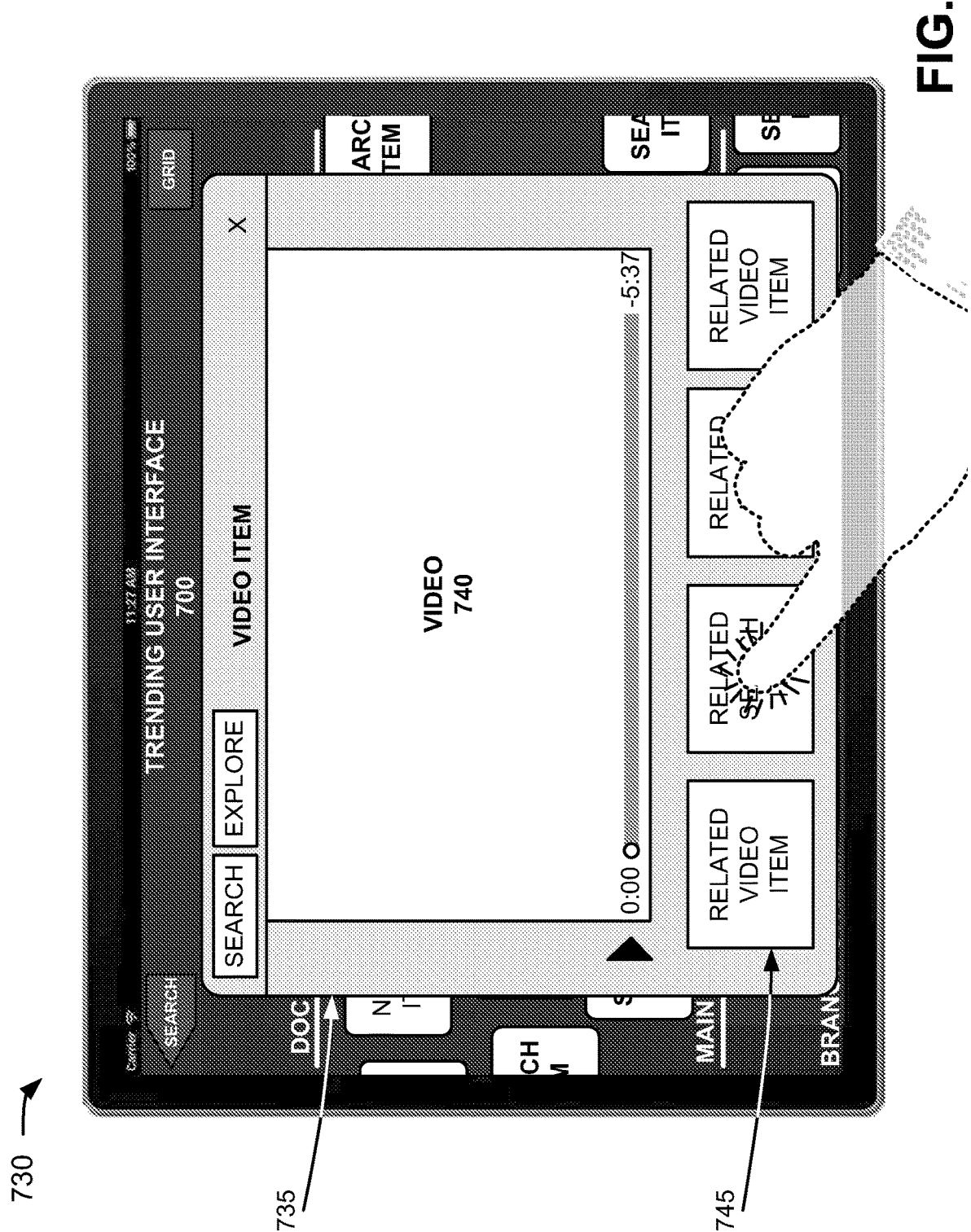
Figure 7F:
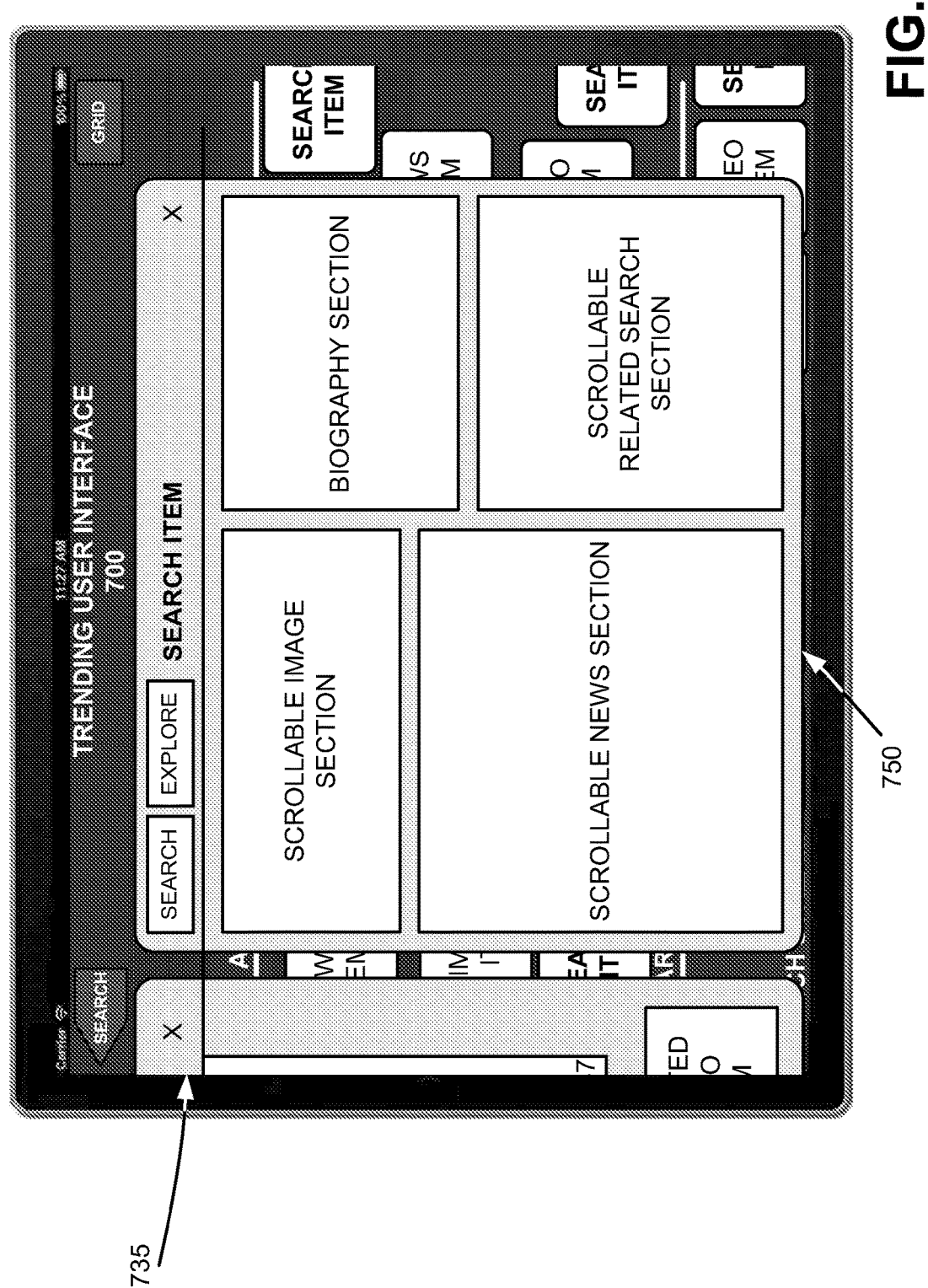

With continued reference to FIG. 7D, assume that the user is interested in a particular video-related item in main area 705. Thus, the user may select the video-related item. By selecting the video-related item, user device 210 may cause a user interface 735 to be provided that provides additional information relating to the particular video-related item, as shown in FIG. 7E. With reference to FIG. 7E, user interface 735 may provide a video 740 associated with the video-related item. In addition, user interface 735 may provide additional items 745 that relate to the video. Assume, after watching all or a portion of video 740, that the user is interested in the related search item. Thus, as shown in FIG. 7E, the user may select the related search item. By selecting the related search item, user device 210 may cause a user interface 750 to be provided that provides additional information relating to the related search item, as shown in FIG. 7F. User interface 750 may include, for example, an image section, a news section, a biography section, and a related search section. The image section may include a scrollable area that provides images relating to a topic of the related search item. The news section may include a scrollable area that provides links to news-related documents relating to the topic of the related search item. The biography section may include an area that provides biography information relating to the topic of the related search item. The related search section may include a scrollable area that provides search items relating to the topic of the related search item. Although not shown, user interface 750 may also include a search results section that provides a scrollable area that includes search results for the topic of the related search item. The user may select an item in user interface 750 to obtain another user interface with information relating to the topic of the selected item. In this way, the user may cause user device 210 to present multiple user interfaces that provide information relating to various topics of interest to the user.

If the user is interested in returning to user interface 735, the user may either close user interface 750 or swipe user interface 735 to the right to cause user interface 735 to be fully displayed in trending user interface 700. If the user is interested in returning to main area 705, of trending user interface 700, the user may close all of the overlaying user interfaces, touch main area 705, or perform some other kind of act that signifies a desire to return to main area 705.

Figure 7G:
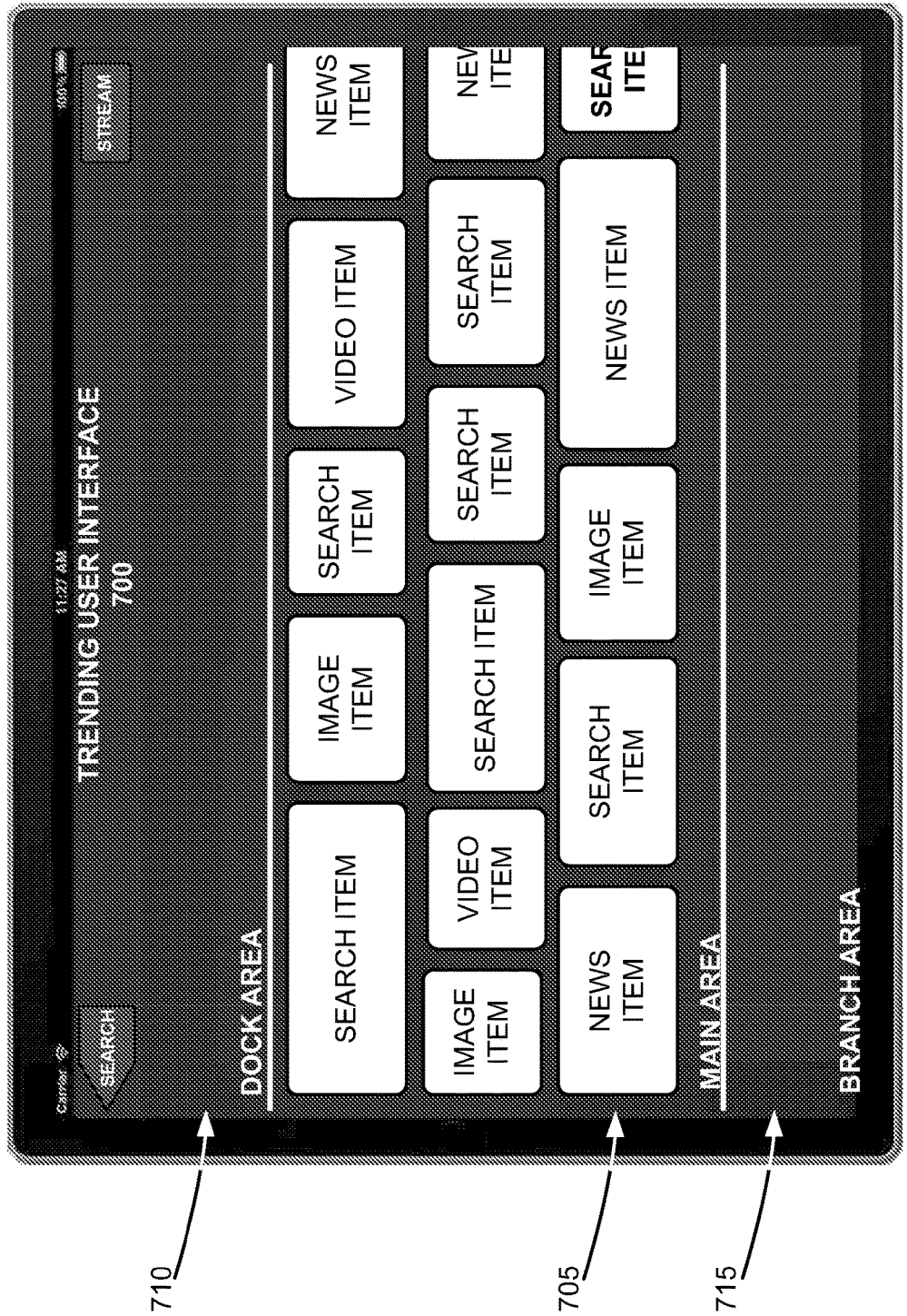
Figure 7H:
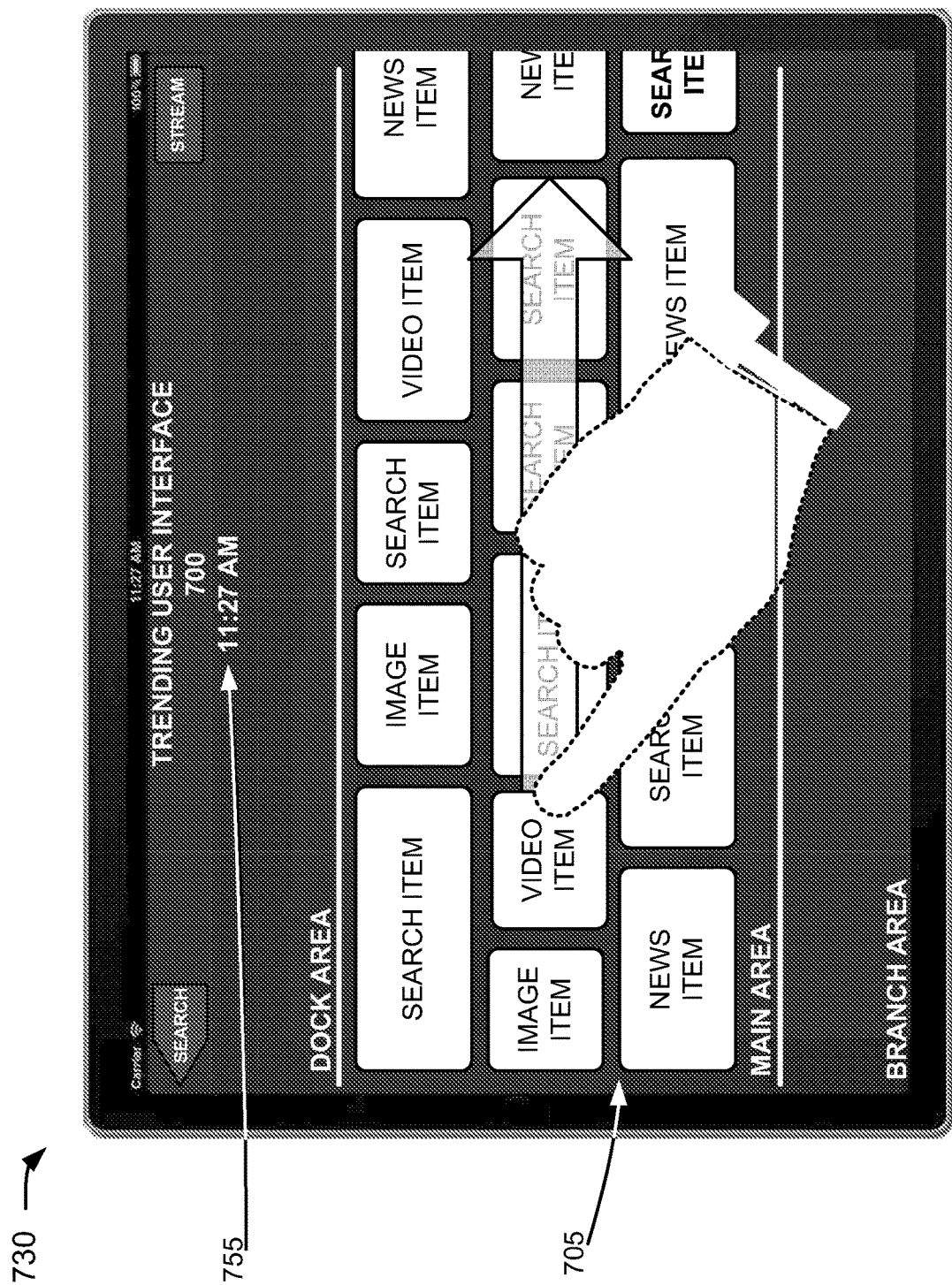

With reference back to FIG. 7B, assume that the user wishes to display the items, in main area 705, in a static manner. To do so, the user may select display element 725. As shown in FIG. 7G, user device 210 may, in response to the user's selection of display element 725, cause the items to be displayed in main area 705 in a static manner. The user may browse items, in this configuration, by moving the items, displayed in main area 705, in a left-to-right or a right-to-left direction. For example, the user may make a right-to-left swiping motion (or another type of gesture) to move items on the right side of trending user interface 700 to the left side of trending user interface 700. In some implementations, the user may simply tilt user device 210 in the direction that the user wishes the items to be moved. For example, if the user tilts user device 210 to the left, user device 210 may cause items on the right side of trending user interface 700 to move toward the left side of trending user interface 700. As another example, if the user tilts user device 210 to the right, user device 210 may cause items on the left side of trending user interface 700 to move toward the right side of trending user interface 700. In some implementations, the degree of tilt may directly correspond to the speed at which the items move across trending user interface 700.

Figure 7I:
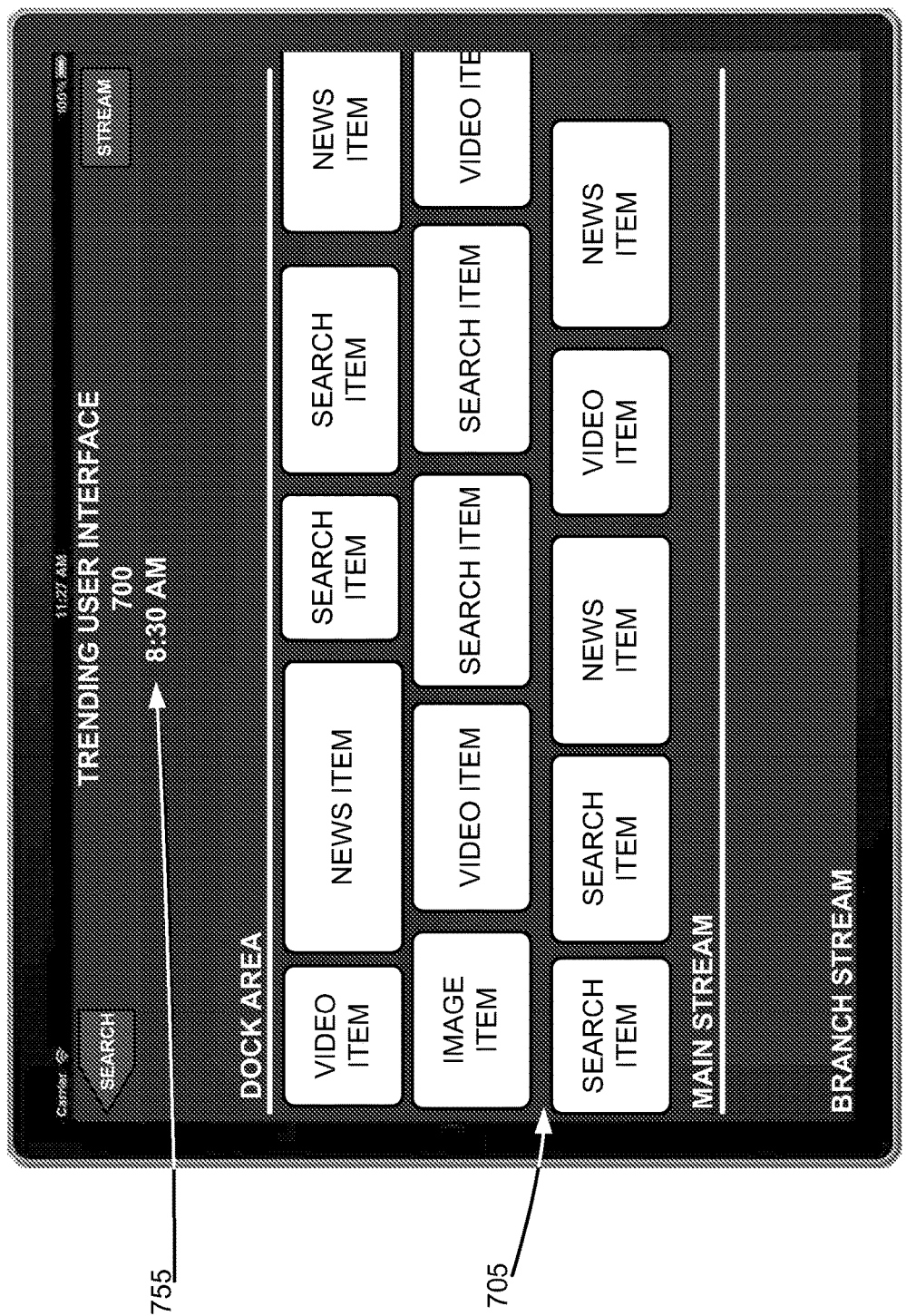

As indicated above, in some implementations, the items, displayed in main area 705, may be associated with date/time information. For example, each item may be associated with the date and/or time at which the item was trending. In some implementations, trending user interface 700 may act as a graphical timeline, where the user may cause trending user interface 700 to provide items that were trending at an earlier point in time. As an example and with reference to FIG. 7H, assume that trending user interface 700 displays a number of items in main area 705. Moreover, assume that trending user interface 700 displays time information 755 relating to when the displayed items were trending. To view what items were trending at an earlier point in time, the user may scroll main area 705 in a left-to-right direction. Assume that the user scrolls main area 705, of trending user interface 700, to an earlier time, as shown in FIG. 7I. In response, trending user interface 700 may display time information 755 identifying the earlier point in time and display items that were trending at the earlier point in time. In this way, trending user interface 700 may provide the user with the ability to see how other users' understanding and interest in a particular topic evolved in news documents, videos, search queries, images, etc.

Figure 7K:
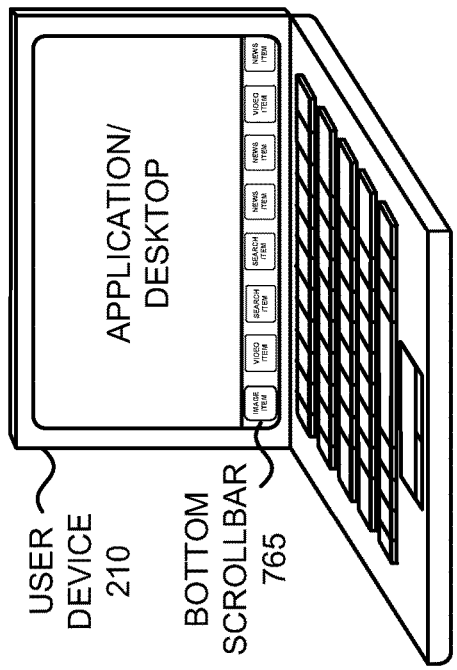
FIGS. 7J-7L are examples of locations at which a trending user interface may be provided on a user device.
Figure 7J:
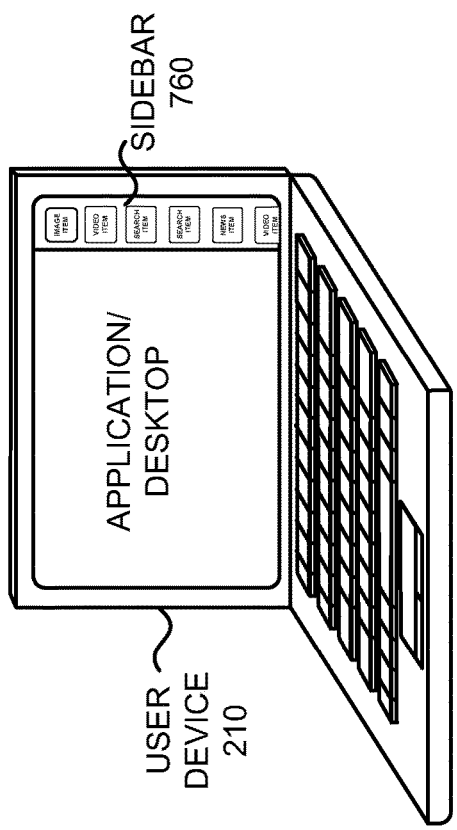
Figure 7L:
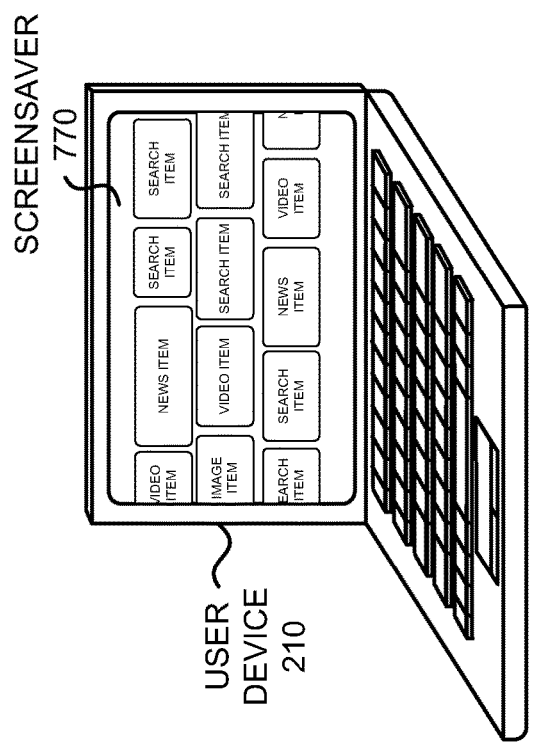

FIGS. 7J-7L are examples of locations at which trending user interface 700 may be provided on user device 210. As shown in FIG. 7J, trending user interface 700 may be provided as a sidebar 760 on user device 210. As shown in FIG. 7K, trending user interface 700 may be provided as a footer bar 765 on user device 210. As shown in FIG. 7L, trending user interface 700 may be provided as a screensaver 770 on user device 210. In some implementations, trending user interface 700 may be provided in a different manner or location on user device 210. For example, trending user interface 700 may be provided in a browser window of user device 210, as desktop wallpaper of user device 210, or as a part of a download application.

FIG. 7M is an example configuration of an item 775 that may be provided on the trending user interface. In essence, item 775 may include enough information to allow a user, of the trending user interface, to identify the topic and category to which item 775 relates. As shown, item 775 may include an image section 780, a category designation section 785, and a title section 790. Image section 780 may include an image relating to item 775. For example, when item 775 is a search-related item, image section 780 may include an image relating to a term or terms to which the search-related item relates. When item 775 is a video-related item, image section 780 may include an image captured from the video that is provided when the video-related item is selected. When item 775 is an image-related item, image section 780 may include the image that is provided when the image-related item is selected. When item 775 is a news-related item, image section 780 may include an image obtained from a news document associated with the news-related item.

Category designation section 785 may include information that identifies the category to which item 775 relates. In some implementations and as shown in FIG. 7M, the category information may be provided in a graphical form. In some implementations, the category information may be provided textually or in some other manner.

Title section 790 may include a title for item 775. In some implementations, the title may be provided textually. In some implementations, the title may be provided in another manner. In some implementations, the location of the title may be different, depending on the category to which item 775 relates. For example, when item 775 is a news-related item, title section 790 may overlay image section 780, and when item 775 is an image-related item, title section 790 may be located below image section 780.

Although FIG. 7M shows an example configuration of item 775, in some implementations, item 775 may include additional sections, different sections, fewer sections, or differently arranged sections than those depicted in FIG. 7M.

Figure 8A:
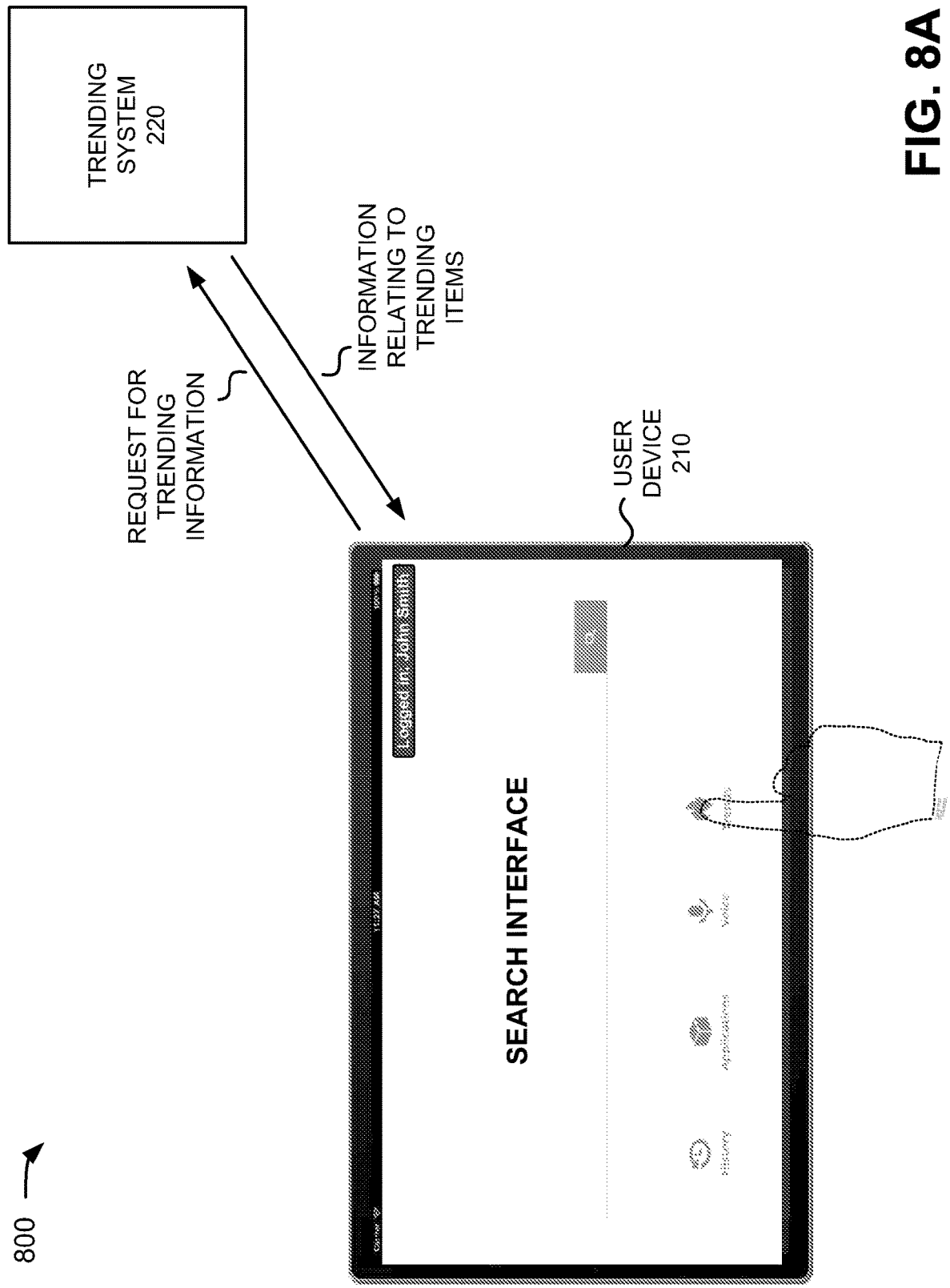
FIGS. 8A-8I are another example of the process described with respect to FIGS. 6A and 6B.

FIGS. 8A-8I are another example 800 of the process described above with respect to FIGS. 6A and 6B. With reference to FIG. 8A, assume a user, named John Smith, is interested in obtaining trending information. The user may select an element, called "Trends," from a user interface to obtain the trending information. Upon selection of the element, user device 210 may send a request for trending information to trending system 220. Trending system 220 may identify trending items that are to be provided to user device 210, for example, based on configuration parameters associated with user, John Smith, and may provide information relating to the trending items to user device 210.

Figure 8B:
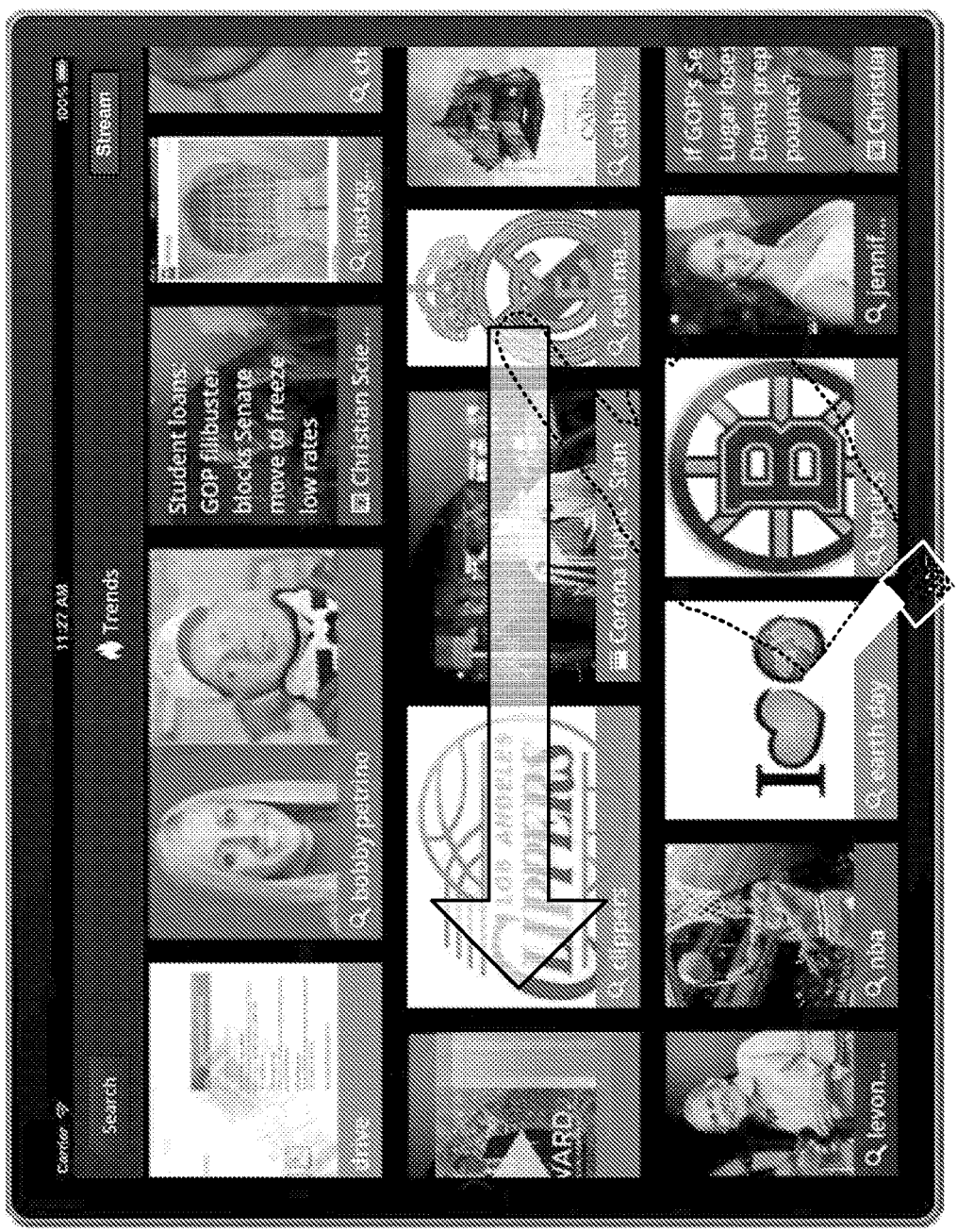

Assume that user device 210 receives the information, from trending system 220, and provides a trending user interface based on the information, as shown in FIG. 8B. As shown, the trending user interface may display a group of items, of various categories, in a static manner. To browse through the items, the user may move the group of items in a right-to-left direction or a left-to-right direction. In either event, items will be removed from the trending user interface and additional items will be provided on the trending user interface. Assume, as shown in FIG. 8B, that the user wishes to view additional items and makes a right-to-left swiping motion across the trending user interface. As a result, user device 210 may cause items on the right side of the trending user interface to move toward the left side of trending user interface and may cause additional items to appear on the right side of the trending user interface, as shown in FIG. 8C.

Figure 8C:
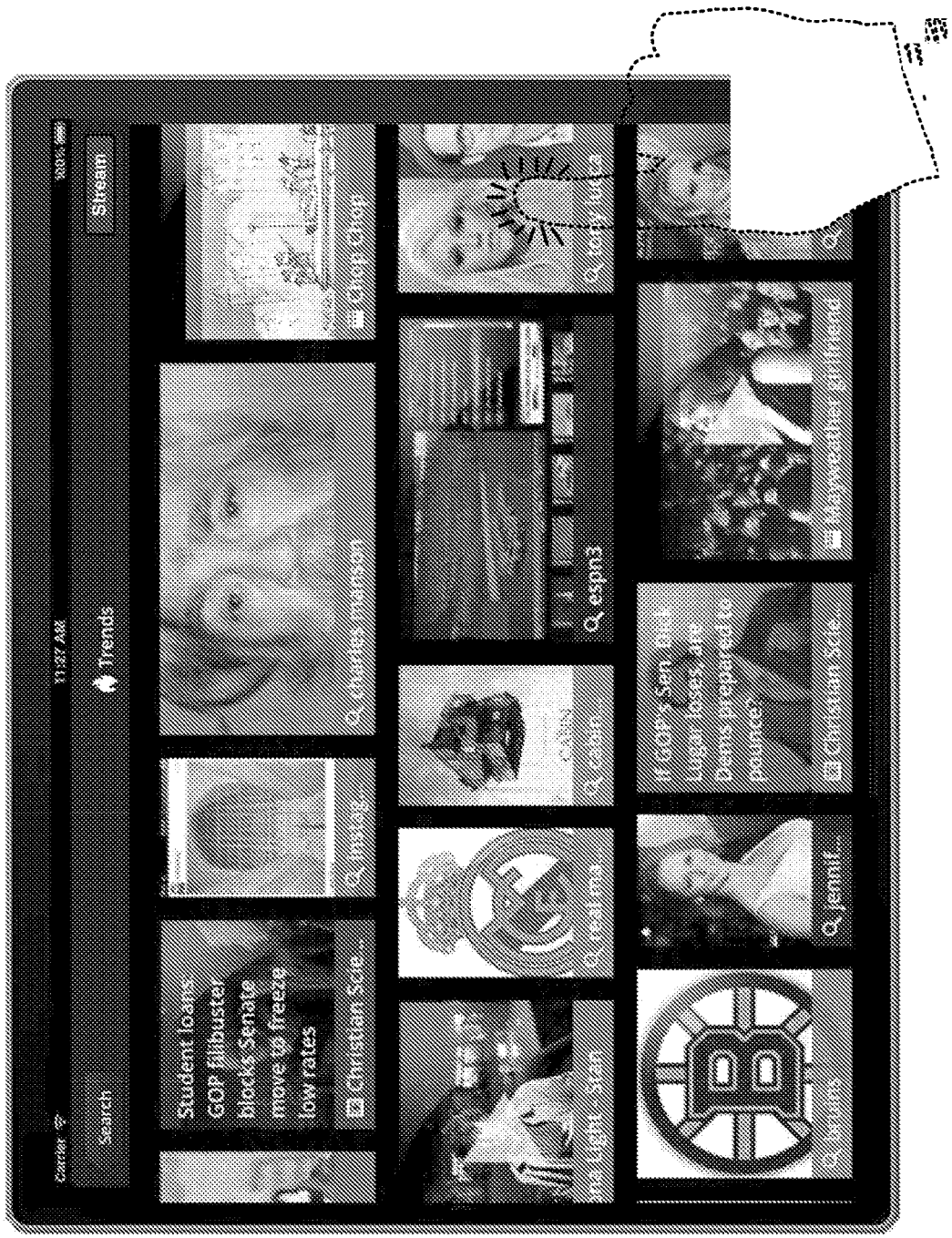

With continued reference to FIG. 8C, assume the user has identified an item of interest. For example, assume that the user has found the search-related item, titled "tony lucca," to be of interest. Thus, the user may select the search-related item to obtain additional information relating to "tony lucca."

Figure 8D:
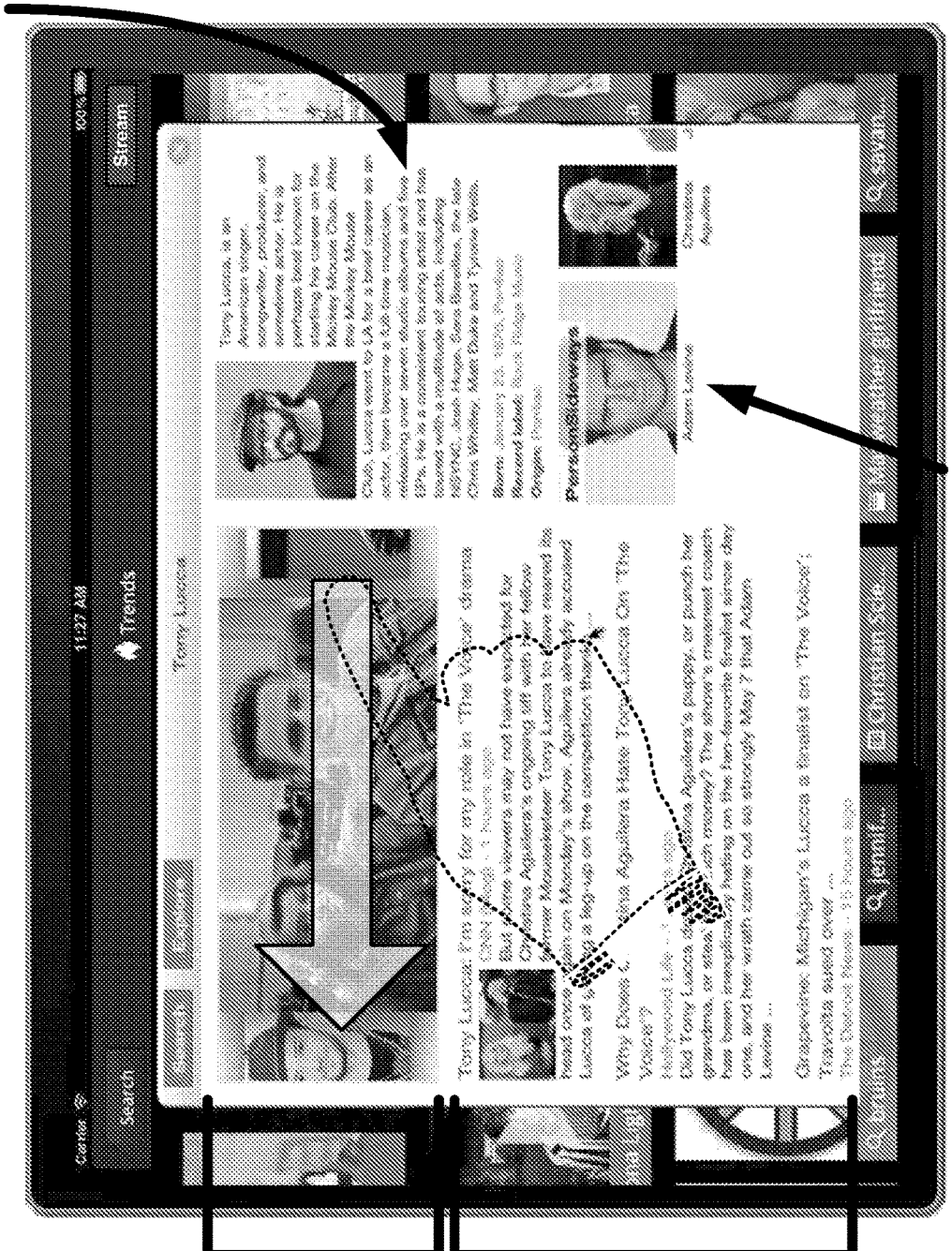

As shown in FIG. 8D, user device 210 may, in response to selection of the search-related item, cause a pop-up window to appear. The pop-up window may display search-related information relating to the topic of the selected search-related item. "tony lucca." As shown, the pop-up window may include an image section that provides a scrollable list of images identified as relevant to the topic, "tony lucca," a search results section that provides search results relating to "tony lucca," a biography section that provides biographical information relating to "tony lucca," and a related search section that provides a scrollable list of search-related items for people that are determined to be relevant to "tony lucca."

Figure 8E:
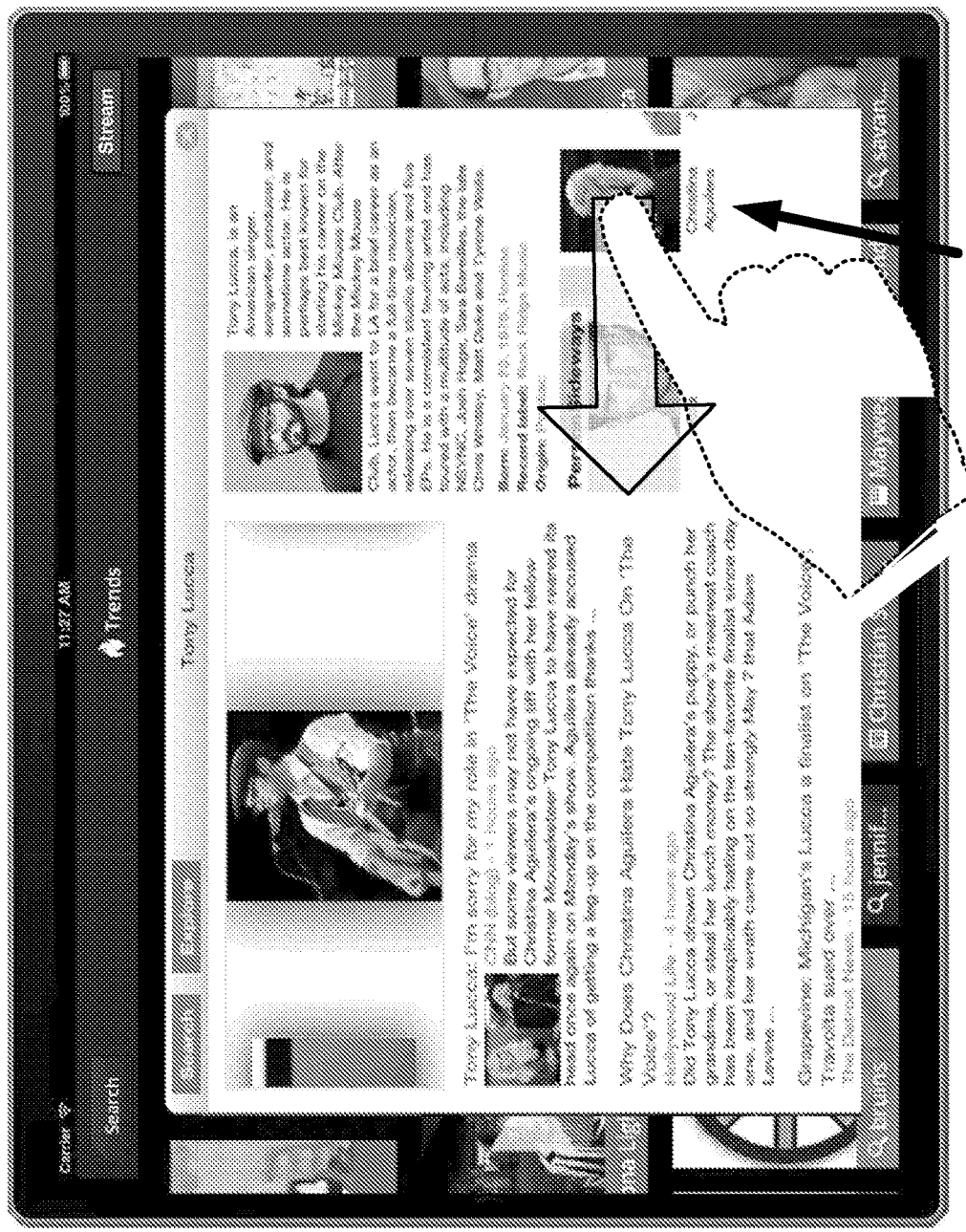

For example 800, assume that the user scrolls through the images, in the image section of the pop-up window, to identify an image of interest. Thus, the user may make a swiping or other kind of motion on an image in the image section of the pop-up window. Thus, as shown in FIG. 8E, one or more different images may be displayed in the image section of the pop-up window.

Assume further that the user did not find an image of interest in the image section, so instead, decides to scroll through the items in the related search section. Thus, the user may make a swiping or other kind of motion on an item in the related search section of the pop-up window. Thus, as shown in FIG. 8F, one or more different items may be displayed in the related search section of the pop-up window.

Figure 8F:
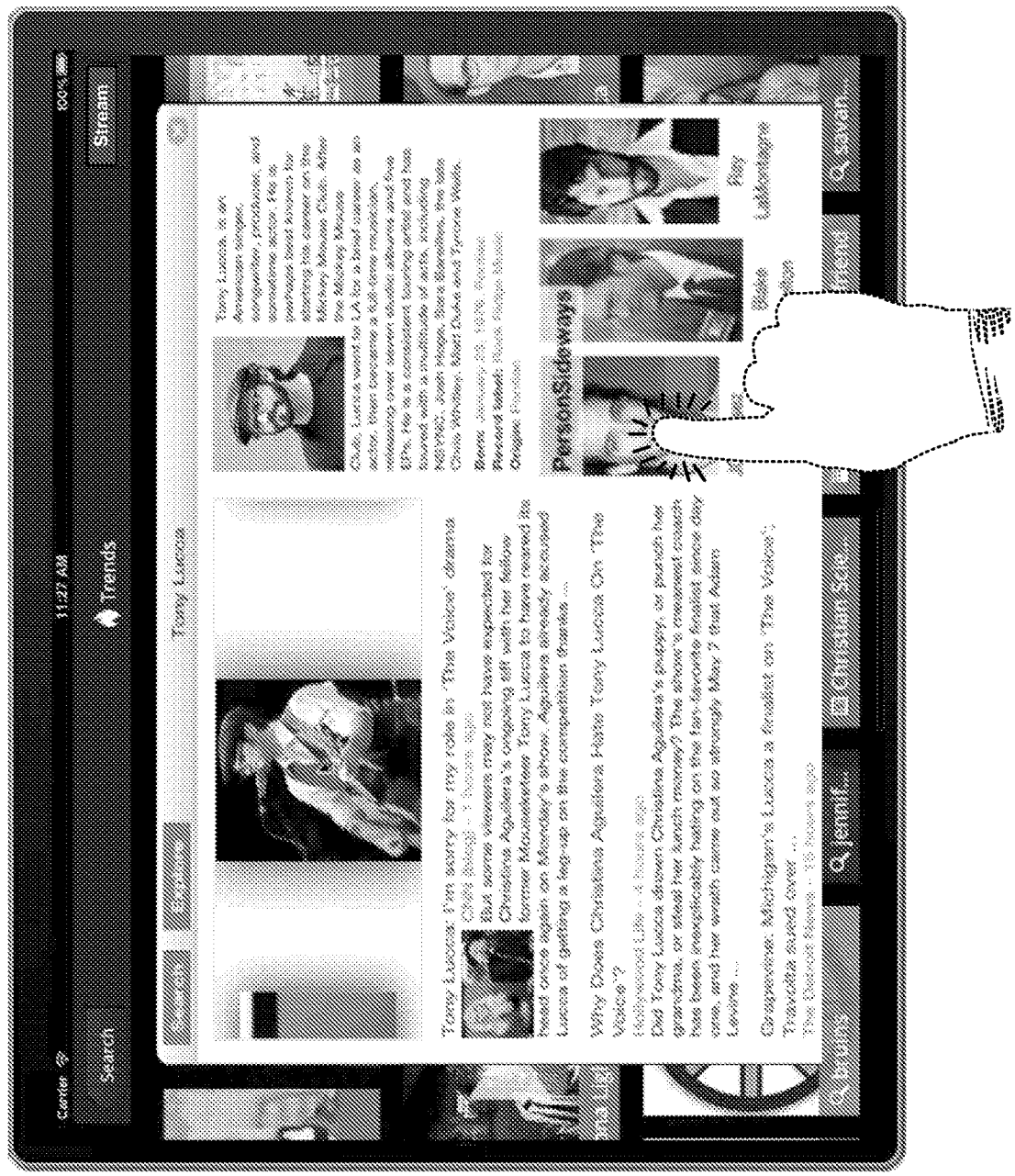
Figure 8G:
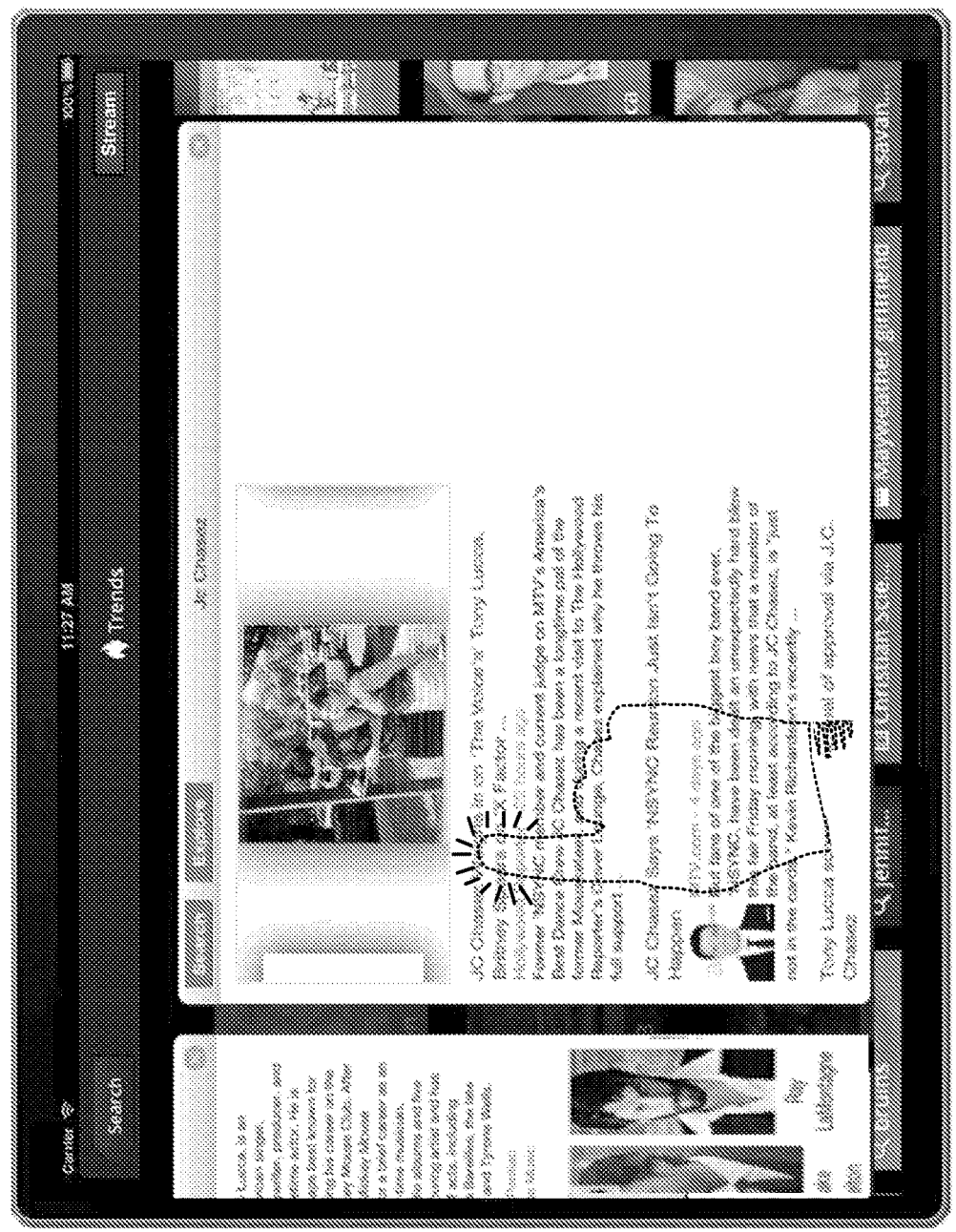

Assume, with continued reference to FIG. 8F, that the user is interested in obtaining additional information relating to an item in the related search section. Thus, the user may select the item by, for example, touching the item, clicking on the item, etc. User device 210 may, based on detecting that the item has been selected, move the existing pop-window to the left and present a new pop-up window, relating to the topic of the item, as shown in FIG. 8G. The new pop-up window may be configured in a manner similar to the configuration of the existing pop-up window. For example, the new pop-up window may include an image section that provides a scrollable list of images identified as relevant to the new topic, which is shown as "Jc Chasez," a search results section that provides search results relating to the new topic, a biography section that provides biographical information relating to the new topic, and/or a related search section that provides a scrollable list of search-related items for people that are determined to be relevant to the new topic.

Figure 8H:
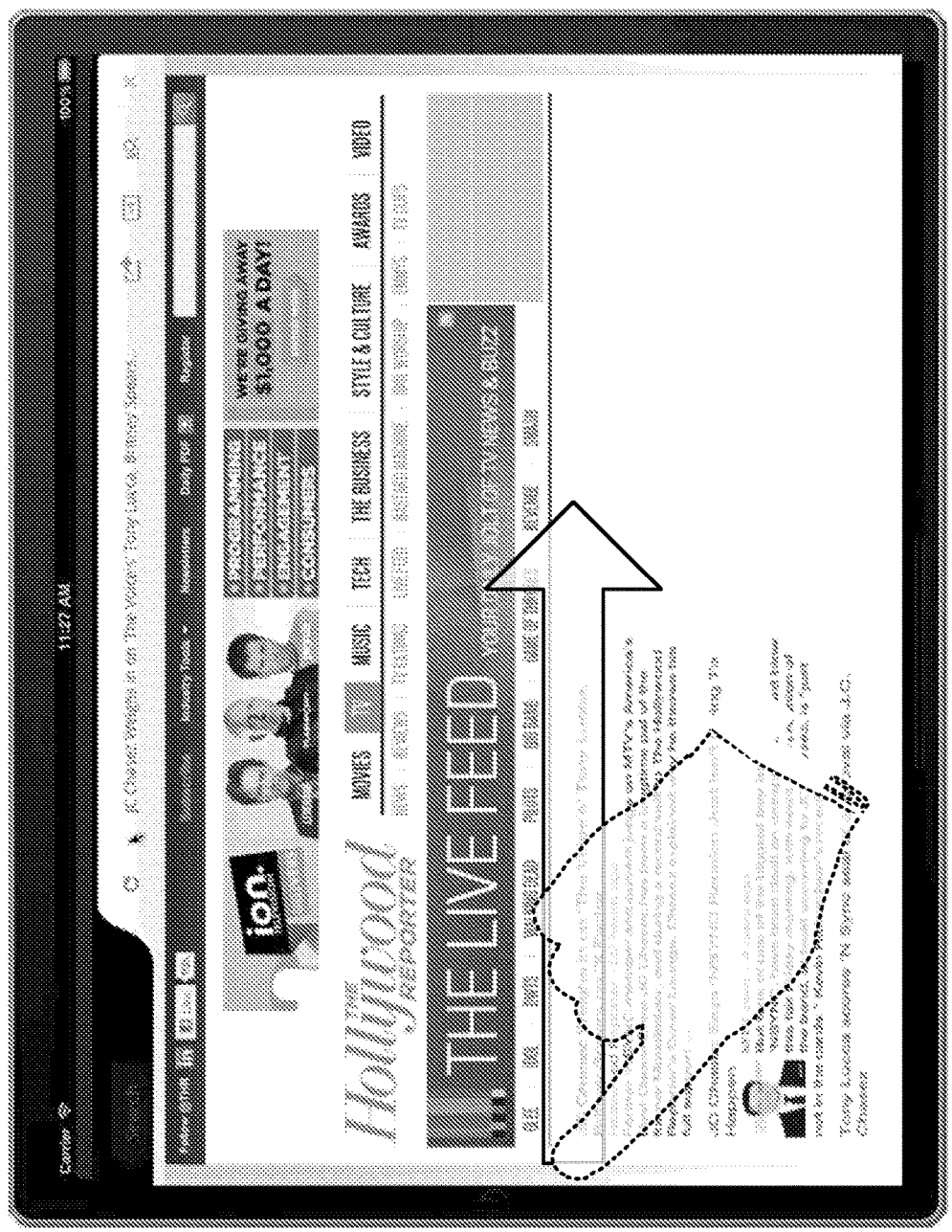
Figure 8I:
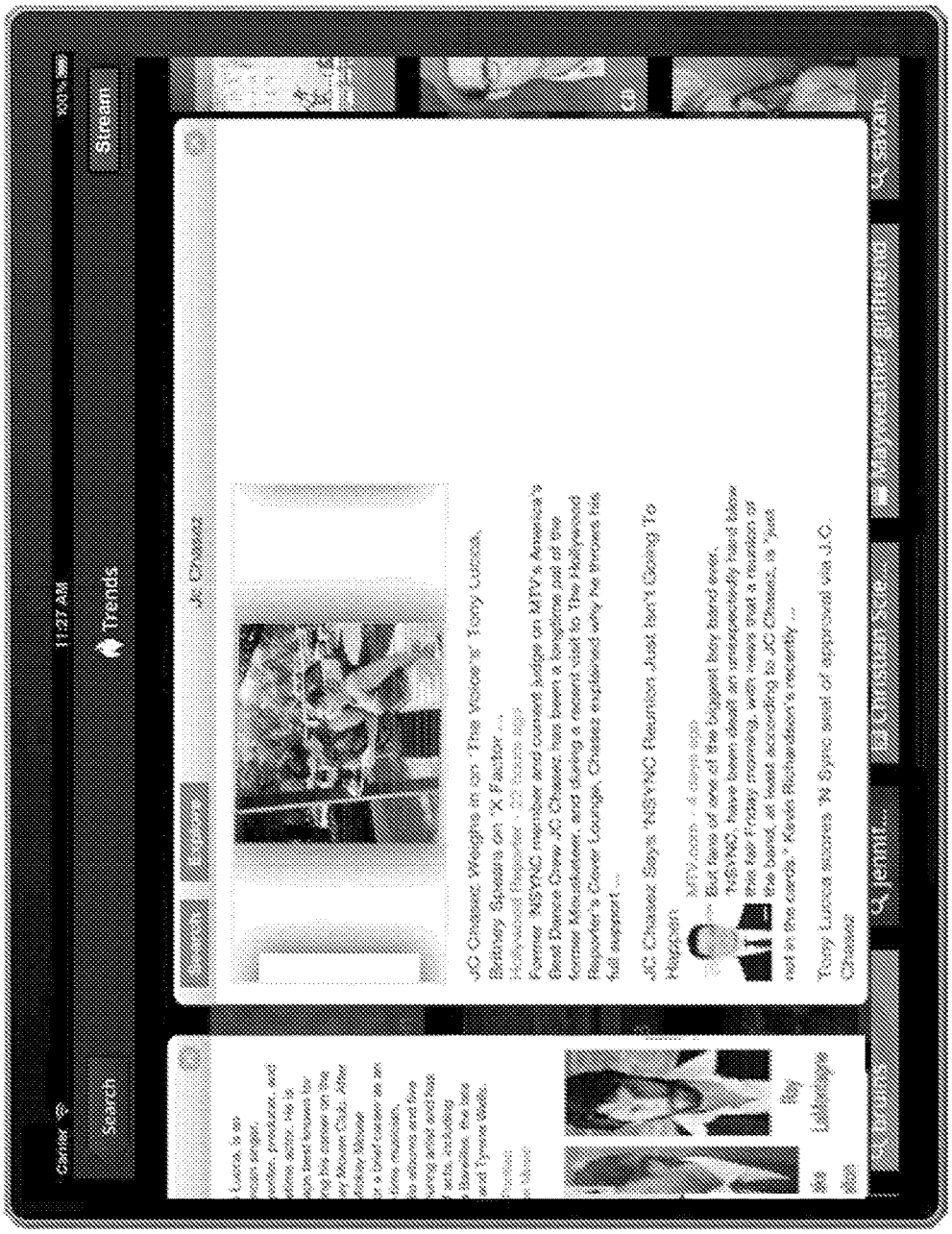

Assume, with reference to FIG. 8G, that the user is interested in one of the search results in the search results section of the new pop-up window. Thus, the user may select the search result by, for example, touching the search result, clicking on the search result, etc. User device 210 may, based on detecting that the search result has been selected, obtain a document relating to the search result. For example, user device 210 may retrieve a document that corresponds to the selected search result and cause that document to be presented to the user, as shown in FIG. 8H. If the user wishes to return to the trending user interface, the user may cause user device 210 to close the existing document being presented or may provide a particular gesture on the trending user interface. In example 800, the particular gesture may be a swiping motion from left to right on the presented document. Other types of gestures may alternatively be used. Thus, if user device 210 detects the particular gesture, user device 210 may close the presented document, causing the trending user interface to be presented again, as shown in FIG. 8I.

Figure 9:
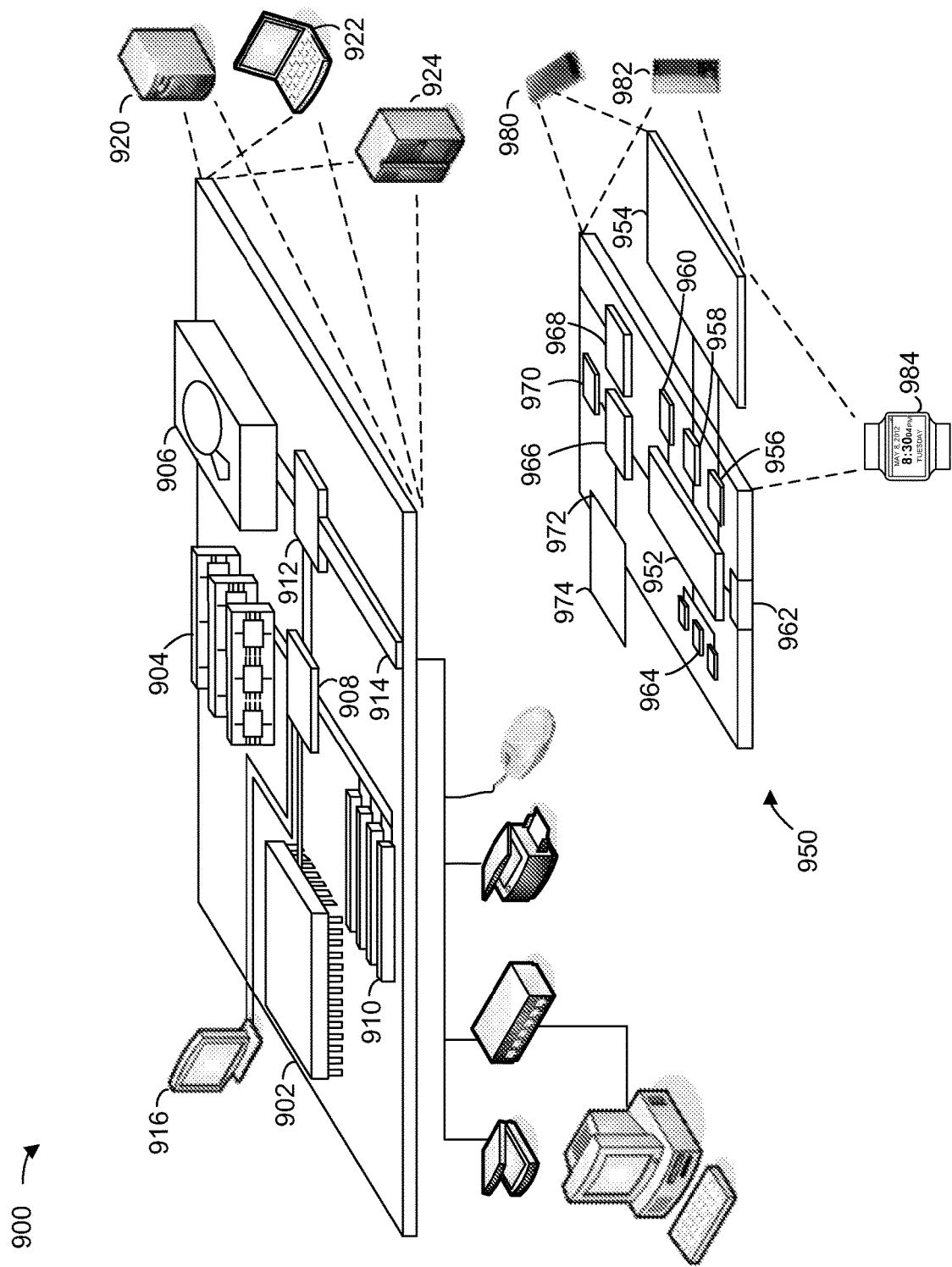
FIG. 9 is a diagram of an example of a generic computer device and a generic mobile computer device.

FIG. 9 is a diagram of an example of a generic computing device 900 and a generic mobile computing device 950, which may be used with the techniques described herein. Generic computing device 900 or generic mobile computing device 950 may correspond to, for example, a user device 210, trending system 220, and/or a server 230. Computing device 900 is intended to represent various forms of digital computers, such as laptops, desktops, workstations, personal digital assistants, servers, blade servers, mainframes, and other appropriate computers. Mobile computing device 950 is intended to represent various forms of mobile devices, such as personal digital assistants, cellular telephones, smart phones, and other similar computing devices. The components shown in FIG. 9, their connections and relationships, and their functions, are meant to be examples only, and are not meant to limit implementations described herein.

Computing device 900 may include a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. Processor 902 can process instructions for execution within the computing device 900, including instructions stored in the memory 904 or on the storage device 906 to display graphical information for a graphical user interface (GUI) on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations, as a server bank, a group of blade servers, or a multi-processor system, etc.

Memory 904 stores information within the computing device 900. In some implementations, memory 904 includes a volatile memory unit or units. In some implementations, memory 904 includes a non-volatile memory unit or units. The memory 904 may also be another form of computer-readable medium, such as a magnetic or optical disk. A computer-readable medium may refer to a non-transitory memory device. A memory device may refer to storage space within a single storage device or spread across multiple storage devices.

The storage device 906 is capable of providing mass storage for the computing device 900. In some implementations, storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 904, storage device 906, or memory on processor 902.

High speed controller 908 manages bandwidth-intensive operations for the computing device 900, while low speed controller 912 manages lower bandwidth-intensive operations. Such allocation of functions is exemplary only. In one implementation, high-speed controller 908 is coupled to memory 904, display 916 (e.g., through a graphics processor or accelerator), and to high-speed expansion ports 910, which may accept various expansion cards (not shown). In this implementation, low-speed controller 912 is coupled to storage device 906 and low-speed expansion port 914. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 900 may be implemented in a number of different forms, as shown in the figure. For example, computing device 900 may be implemented as a standard server 920, or multiple times in a group of such servers. Computing device 900 may also be implemented as part of a rack server system 924. In addition, computing device 900 may be implemented in a personal computer, such as a laptop computer 922. Alternatively, components from computing device 900 may be combined with other components in a mobile device (not shown), such as mobile computing device 950. Each of such devices may contain one or more of computing devices 900, 950, and an entire system may be made up of multiple computing devices 900, 950 communicating with each other.

Mobile computing device 950 may include a processor 952, memory 964, an input/output ("I/O") device, such as a display 954, a communication interface 966, and a transceiver 968, among other components. Mobile computing device 950 may also be provided with a storage device, such as a micro-drive or other device, to provide additional storage. Each of the components 950, 952, 964, 954, 966, and 968 are interconnected using various buses, and several of the components may be mounted on a common motherboard or in other manners as appropriate.

Processor 952 can execute instructions within mobile computing device 950, including instructions stored in memory 964. Processor 952 may be implemented as a chipset of chips that include separate and multiple analog and digital processors. Processor 952 may provide, for example, for coordination of the other components of mobile computing device 950, such as control of user interfaces, applications run by mobile computing device 950, and wireless communication by mobile computing device 950.

Processor 952 may communicate with a user through control interface 958 and display interface 956 coupled to a display 954. Display 954 may be, for example, a TFT LCD (Thin-Film-Transistor Liquid Crystal Display) or an OLED (Organic Light Emitting Diode) display, or other appropriate display technology. Display interface 956 may comprise appropriate circuitry for driving display 954 to present graphical and other information to a user. Control interface 958 may receive commands from a user and convert them for submission to the processor 952. In addition, an external interface 962 may be provide in communication with processor 952, so as to enable near area communication of mobile computing device 950 with other devices. External interface 962 may provide, for example, for wired communication in some implementations, or for wireless communication in other implementations, and multiple interfaces may also be used.

Memory 964 stores information within mobile computing device 950. Memory 964 can be implemented as one or more of a computer-readable medium or media, a volatile memory unit or units, or a non-volatile memory unit or units. Expansion memory 974 may also be provided and connected to mobile computing device 950 through expansion interface 972, which may include, for example, a SIMM (Single In Line Memory Component) card interface. Such expansion memory 974 may provide extra storage space for device 950, or may also store applications or other information for mobile computing device 950. Specifically, expansion memory 974 may include instructions to carry out or supplement the processes described above, and may include secure information also. Thus, for example, expansion memory 974 may be provide as a security component for mobile computing device 950, and may be programmed with instructions that permit secure use of device 950. In addition, secure applications may be provided via the SIMM cards, along with additional information, such as placing identifying information on the SIMM card in a non-hackable manner.

Expansion memory 974 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Mobile computing device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver component 970 may provide additional navigation- and location-related wireless data to mobile computing device 950, which may be used as appropriate by applications running on mobile computing device 950.

Mobile computing device 950 may also communicate audibly using audio codec 960, which may receive spoken information from a user and convert it to usable digital information. Audio codec 960 may likewise generate audible sound for a user, such as through a speaker, e.g., in a handset of mobile computing device 950. Such sound may include sound from voice telephone calls, may include recorded sound (e.g., voice messages, music files, etc.) and may also include sound generated by applications operating on mobile computing device 950.

Mobile computing device 950 may be implemented in a number of different forms, as shown in the figure. For example, mobile computing device 950 may be implemented as a cellular telephone 980. Mobile computing device 950 may also be implemented as part of a smart phone 982, personal digital assistant, a watch 984, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Systems and methods, described herein, may provide different categories of trending information in a single user interface. The user interface presents the trending information in a manner that allows the user to quickly review and identify information of interest across the different categories of trending information.

The foregoing description provides illustration and description, but is not intended to be exhaustive or to limit the implementations to the precise form disclosed. Modifications and variations are possible in light of the above disclosure or may be acquired from practice of the implementations.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a user device, a request for information related to a first entity;
   obtaining, by the user device, information related to the first entity;
   obtaining, by the user device, information identifying multiple different entities that are related to the first entity;
   generating, by the user device, a first search results page for display in a user interface of the user device, wherein:
   (i) a first portion of the first search results page includes the obtained information related to the first entity that is identified as being responsive to the received request for information, and
   (ii) a second portion of the first search results page includes a plurality of respective scrollable sets of search items, wherein for each category of a plurality of categories, one respective scrollable set of related search items for the category is displayed so that the plurality of respective scrollable sets of search items for the plurality of categories is concurrently displayed, wherein each related search item in the scrollable set of related search items represents a particular entity of the multiple different entities that is related to the first entity, wherein each related search item in the scrollable set of related search items, when the related search item is rendered as a portion of the scrollable set of related search items that is rendered in the user interface of the user device, is configured to (i) move responsive to an input gesture from a user of the user device without causing the first search results page to move and (ii) initiate, upon selection of the related search item, a request for information related to the particular entity that is represented by the selected related search item, and wherein each scrollable set of related search items for a category can be scrolled separately from each other scrollable set of search items for each other category;
   providing, by the user device, as a first overlay on the user interface, the first search results page comprising (i) the first portion of the search result page that includes at least a portion of the obtained information related to the first entity and (ii) the second portion of the first search results page that includes one or more related search items of the scrollable set of related search items for display in the user interface of the user device;
   receiving, by the user device, a selection of one of the related search items in the second portion of the first search results page;
   obtaining, by the user device, information related to a second entity corresponding to the selected related search item;
   generating, by the user device, a second search results page that includes the obtained information related to the second entity, for display in the user interface of the user device; and
   moving, by the user device, the first overlay on the user interface and providing the second search results page as a second overlay on the user interface.

2. The method of claim 1, wherein obtaining, by the user device, information related to the first entity comprises obtaining the information related to the first entity from a server device.

3. The method of claim 1, wherein the scrollable set of related search items is configured to (i) move horizontally from left to right responsive to a detection of a first swipe gesture from the user of the user device without moving the first search results page or (ii) scroll horizontally from right to left responsive to a detection of a second swipe gesture from the user of the user device without moving the first search results page.

4. The method of claim 1, wherein the one or more related search items of the scrollable set of related search items comprises a subset of the scrollable set of related search items that displays less than all of the related search items of the scrollable list of related search items.

5. The method of claim 1,
wherein the one or more related search items of the scrollable set of related search items comprises a first related search item, a second related search item, and a third related search item;
wherein the method further comprises:
   detecting, by the user device, a gesture from the user; and
   responsive to the gesture, moving the first related search item off of a displayed portion of the user interface so that the first related search item is no longer visible in the user interface, moving the second related search item to the location previously occupied by the first related search item prior to the detected gesture, moving the third related search item to the location previously occupied by the second related search item prior to the detected gesture, and moving a fourth related search item into the location previously occupied by the third related search item, wherein the fourth related search item was not visible in the user interface prior to the detected gesture.

6. A device comprising:
one or more computers and one or more storage devices storing instructions that are operable, when executed by the one or more computers, to cause the one or more computers to perform operations comprising:
receiving, by a user device, a request for information related to a first entity;
obtaining, by the user device, information related to the first entity;
obtaining, by the user device, information identifying multiple different entities that are related to the first entity;
generating, by the user device, a first search results page for display in a user interface of the user device, wherein:
   (i) a first portion of the first search results page includes the obtained information related to the first entity that is identified as being responsive to the received request for information, and
   (ii) a second portion of the first search results page includes a plurality of respective scrollable sets of search items, wherein for each category of a plurality of categories, one respective scrollable set of related search items for the category is displayed so that the plurality of respective scrollable sets of search items for the plurality of categories is concurrently displayed, wherein each related search item in the scrollable set of related search items represents a particular entity of the multiple different entities that is related to the first entity, wherein each related search item in the scrollable set of related search items, when the related search item is rendered as a portion of the scrollable set of related search items that is rendered in the user interface of the user device, is configured to (i) move responsive to an input gesture from a user of the user device without causing the first search results page to move and (ii) initiate, upon selection of the related search item, a request for information related to the particular entity that is represented by the selected related search item, and wherein each scrollable set of related search items for a category can be scrolled separately from each other scrollable set of search items for each other category; and providing, by the user device, as a first overlay on the user interface, the first search results page comprising (i) the first portion of the search result page that includes at least a portion of the obtained information related to the first entity and (ii) the second portion of the first search results page that includes one or more related search items of the scrollable set of related search items for display in the user interface of the user device;
receiving, by the user device, a selection of one of the related search items in the second portion of the first search results page;
obtaining, by the user device, information related to a second entity corresponding to the selected related search item;
generating, by the user device, a second search results page that includes the obtained information related to the second entity, for display in the user interface of the user device; and
moving, by the user device, the first overlay on the user interface and providing the second search results page as a second overlay on the user interface.

7. The device of claim 6, wherein obtaining, by the user device, information related to the first entity comprises obtaining the information related to the first entity from a server device.

8. The device of claim 6, wherein the scrollable set of related search items is configured to (i) move horizontally from left to right responsive to a detection of a first swipe gesture from the user of the user device without moving the first search results page or (ii) scroll horizontally from right to left responsive to a detection of a second swipe gesture from the user of the user device without moving the first search results page.

9. The device of claim 6, wherein the one or more related search items of the scrollable set of related search items comprises a subset of the scrollable set of related search items that displays less than all of the related search items of the scrollable list of related search items.

10. The device of claim 6,
wherein the one or more related search items of the scrollable set of related search items comprises a first related search item, a second related search item, and a third related search item;
wherein the operations further comprises:
   detecting, by the user device, a gesture from the user; and
   responsive to the gesture, moving the first image off of a displayed portion of the user interface so that the first related search item is no longer visible in the user interface, moving the second related search item to the location previously occupied by the first related search item prior to the detected gesture, moving the third related search item to the location previously occupied by the second related search item prior to the detected gesture, and moving a fourth related search item into the location previously occupied by the third related search item,
wherein the fourth related search item was not visible in the user interface prior to the detected gesture.

11. A non-transitory computer-readable medium storing software comprising instructions executable by one or more computers which, upon such execution, cause the one or more computers to perform operations comprising:

receiving, by a user device, a request for information related to a first entity;

obtaining, by the user device, information related to the first entity;

obtaining, by the user device, information identifying multiple different entities that are related to the first entity;

generating, by the user device, a first search results page for display in a user interface of the user device, wherein:

(i) a first portion of the first search results page includes the obtained information related to the first entity that is identified as being responsive to the received request for information, and (ii) a second portion of the first search results page includes a plurality of respective scrollable sets of search items, wherein for each category of a plurality of categories, one respective scrollable set of related search items for the category is displayed so that the plurality of respective scrollable sets of search items for the plurality of categories is concurrently displayed, wherein each related search item in the scrollable set of related search items represents a particular entity of the multiple different entities that is related to the first entity, wherein each related search item in the scrollable set of related search items, when the related search item is rendered as a portion of the scrollable set of related search items that is rendered in the user interface of the user device, is configured to (i) move responsive to an input gesture from a user of the user device without causing the first search results page to move and (ii) initiate, upon selection of the related search item, a request for information related to the particular entity that is represented by the selected related search item, and wherein each scrollable set of related search items for a category can be scrolled separately from each other scrollable set of search items for each other category;

providing, by the user device, as a first overlay on the user interface, the first search results page comprising (i) the first portion of the search result page that includes at least a portion of the obtained information related to the first entity and (ii) the second portion of the first search results page that includes one or more related search items of the scrollable set of related search items for display in the user interface of the user device;

receiving, by the user device, a selection of one of the related search items in the second portion of the first search results page;

obtaining, by the user device, information related to a second entity corresponding to the selected related search item;

generating, by the user device, a second search results page that includes the obtained information related to the second entity, for display in the user interface of the user device; and moving, by the user device, the first overlay on the user interface and providing the second search results page as a second overlay on the user interface.

12. The computer-readable medium of claim 11, wherein obtaining, by the user device, information related to the first entity comprises obtaining the information related to the first entity from a server device.

13. The computer-readable medium of claim 11, wherein the scrollable set of related search items is configured to (i) move horizontally from left to right responsive to a detection of a first swipe gesture from the user of the user device without moving the first search results page or (ii) scroll horizontally from right to left responsive to a detection of a second swipe gesture from the user of the user device without moving the first search results page.

14. The computer-readable medium of claim 11, wherein the one or more related search items of the scrollable set of related search items comprises a subset of the scrollable set of related search items that displays less than all of the related search items of the scrollable list of related search items.

15. The computer-readable medium of claim 11, wherein the one or more related search items of the scrollable set of related search items comprises a first related search item, a second related search item, and a third related search item;

wherein the operations further comprises:

detecting, by the user device, a gesture from the user; and responsive to the gesture, moving the first image off of a displayed portion of the user interface so that the first related search item is no longer visible in the user interface, moving the second related search item to the location previously occupied by the first related search item prior to the detected gesture, moving the third related search item to the location previously occupied by the second related search item prior to the detected gesture, and moving a fourth related search item into the location previously occupied by the third related search item, wherein the fourth related search item was not visible in the user interface prior to the detected gesture.

16. The method of claim 1, wherein the first overlay is a first pop-up window that is displayed on the user interface and the second overlay is a second pop-up window that is displayed on the user interface.

17. The method of claim 1, wherein the moving the first overlay on the user interface comprises moving the first overlay to a side of the user interface such that only a portion of the first overlay is displayed on the user interface.

* * * * *